(12) United States Patent
Hanses et al.

(10) Patent No.: US 9,547,713 B2
(45) Date of Patent: Jan. 17, 2017

(54) SEARCH RESULT TAGGING

(71) Applicant: Microsoft Technology Licensing, LLC, Redmond, WA (US)

(72) Inventors: Anthony Adam Hanses, Woodinville, WA (US); Sarthak Deepak Shah, Kirkland, WA (US); Lawrence Brian Ripsher, Seattle, WA (US); Marguerite R. Loader, Shoreline, WA (US); Douglas William Herman, Issaquah, WA (US); Robert Scott Dietz, Bellevue, WA (US); Brook John Durant, Bellevue, WA (US); William James Wagner, Seattle, WA (US); Melroy Edwin D'Souza, Bellevue, WA (US); Philip Andrew Rogan, Seattle, WA (US); Feridoon Malekzadeh, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 480 days.

(21) Appl. No.: 13/874,165

(22) Filed: Apr. 30, 2013

(65) Prior Publication Data
US 2014/0324828 A1 Oct. 30, 2014

(51) Int. Cl.
*G06F 17/30* (2006.01)
(52) U.S. Cl.
CPC ... *G06F 17/30613* (2013.01); *G06F 17/30693* (2013.01); *G06F 17/30882* (2013.01); *G06F 17/30884* (2013.01)
(58) Field of Classification Search
None
See application file for complete search history.

(56) References Cited

U.S. PATENT DOCUMENTS 6,507,865 B1    1/2003    Hanson et al.
7,668,821 B1    2/2010    Donsbach et al.
(Continued)

FOREIGN PATENT DOCUMENTS

EP          2107472 A1    10/2009
WO      2012160567       11/2012

OTHER PUBLICATIONS

"International Search Report and Written Opinion Received for Patent Application No. PCT/US2014/035992", Mailed Date: Oct. 1, 2014, 10 Pages.
(Continued)

*Primary Examiner* — Jay Morrison
(74) *Attorney, Agent, or Firm* — Jessica Meyers; Tom Wong; Micky Minhas

(57) ABSTRACT

One or more techniques and/or systems are provided for tagging search results, organizing tagged search results for later access from various devices, public sharing of tagged search results, and/or providing targeted content based upon search results tagged by a user. That is, a user may tag a search result (e.g., a website, an image, a social network profile, etc.), such as through a one-click user input, with a tag to create a tagged search result. The tagged search result may be organized into a public tag collection for sharing and/or exploration of tagged search results by other users. The tagged search result may be organized into a personal tag collection for later access by the user from any device. Because the tagged search result may be indicative of an interest of the user, targeted content associated with the tagged search result may be provided to the user.

20 Claims, 18 Drawing Sheets

(56) References Cited

U.S. PATENT DOCUMENTS

| | | | |
|---|---|---|---|
| 8,086,504 B1* | 12/2011 | Dicker et al. | 705/27.1 |
| 8,219,555 B1 | 7/2012 | Mianji | |
| 8,291,492 B2 | 10/2012 | McNally et al. | |
| 8,356,077 B2 | 1/2013 | Robinson et al. | |
| 2006/0155728 A1 | 7/2006 | Bosarge | |
| 2007/0078832 A1* | 4/2007 | Ott et al. | 707/3 |
| 2007/0136244 A1* | 6/2007 | MacLaurin | G06F 17/30964 |
| 2007/0198741 A1 | 8/2007 | Duffy et al. | |
| 2008/0034291 A1 | 2/2008 | Anderson et al. | |
| 2008/0065649 A1 | 3/2008 | Smiler | |
| 2008/0082486 A1* | 4/2008 | Lermant et al. | 707/3 |
| 2009/0063477 A1 | 3/2009 | Adams et al. | |
| 2009/0070426 A1 | 3/2009 | McCauley et al. | |
| 2009/0132969 A1 | 5/2009 | Mayer | |
| 2009/0164267 A1 | 6/2009 | Banatwala et al. | |
| 2009/0222759 A1* | 9/2009 | Drieschner | 715/780 |
| 2009/0281978 A1 | 11/2009 | Gordon et al. | |
| 2009/0293017 A1* | 11/2009 | Carter | G06F 3/0481 715/811 |
| 2010/0036838 A1 | 2/2010 | Ellis | |
| 2010/0153354 A1* | 6/2010 | Buccella et al. | 707/706 |
| 2010/0306672 A1* | 12/2010 | McEniry | G06Q 10/10 715/753 |
| 2011/0078584 A1 | 3/2011 | Winterstein et al. | |
| 2011/0191363 A1 | 8/2011 | Bell et al. | |
| 2011/0282856 A1 | 11/2011 | Ganti et al. | |
| 2011/0282867 A1 | 11/2011 | Palermiti et al. | |
| 2012/0016885 A1 | 1/2012 | Jin et al. | |
| 2012/0096151 A1 | 4/2012 | Chernaik et al. | |
| 2012/0185472 A1 | 7/2012 | Ahmed et al. | |
| 2012/0209835 A1 | 8/2012 | Ahari et al. | |
| 2012/0278343 A1 | 11/2012 | Steele et al. | |
| 2012/0284249 A1 | 11/2012 | Ahmed et al. | |
| 2012/0290575 A1 | 11/2012 | Hu et al. | |
| 2012/0296833 A1 | 11/2012 | Sharma | |
| 2012/0303710 A1 | 11/2012 | Roberts et al. | |
| 2012/0323828 A1 | 12/2012 | Sontag et al. | |
| 2013/0006952 A1 | 1/2013 | Wong et al. | |
| 2013/0046761 A1* | 2/2013 | Soderberg | G06F 17/30038 707/736 |
| 2013/0046826 A1 | 2/2013 | Stanton | |
| 2013/0054614 A1* | 2/2013 | Boyd | G06Q 10/10 707/748 |

OTHER PUBLICATIONS

Preliminary Amendment cited in U.S. Appl. No. 13/874,230 dated Mar. 25, 2014, 3 pgs.

Int. Search Report cited in PCT Application No. PCT/US2014/036000 dated Oct. 1, 2014, 8 pgs.

Whiting, et al., "Hashtags as Milestones in Time", In SIGIR Workshop on Time-aware Information Access, Aug. 16, 2012, 4 pages, http://research.microsoft.com/en-us/people/milads/hashtagsasmilestonesintime.pdf.

Teevan, et al., "#TwitterSearch: A Comparison of Microblog Search and Web Search", In Proceedings of the Fourth ACM International Conference on Web Search and Data Mining, Feb. 9, 2011, 10 pages, http://research.microsoft.com/pubs/154556/wsdm11-twitter.pdf.

Yoshida, et al., "Exploiting Twitter for Spiking Query Classification", In Proceeding of the 8th Asia Information Retrieval Societies Conference, Dec. 17, 2012, 13 pages, https://www.tulips.tsukuba.ac.jp/dspace/bitstream/2241/117625/1/AIRS2012.pdf.

Zhang, et al., "Community Discovery in Twitter Based on User Interests", In Journal of Computational Information Systems, vol. 8, Issue 3, Feb. 2012, 10 pages, http://www.jofcis.com/publishedpapers/2012_8_3_991_1000.pdf.

Chang, et al., "Trends in Twitter Hashtag Applications: Design Features for Value-Added Dimensions to Future Library Catalogues", In Library Trends, vol. 61, Issue 1, Sep. 12, 2012, 12 pages, http://muse.jhu.edu/journals/library_trends/v061/61.1.chang.pdf.

Suh, et al., "Want to be Retweeted? Large Scale Analytics on Factors Impacting Retweet in Twitter Network", In IEEE Second International Conference on Social Computing, Aug. 20, 2010, 8 pages, http://peterpirolli.com/Professional/About_Me_files/2010-04-15-retweetability-v18-final.pdf.

Solachidis, et al, "Collective Intelligence Generation from User Contributed Content", In Advances in Data Analysis, Data Handling and Business Intelligence, Studies in Classification, Data Analysis and Knowledge Organization, Mar. 19, 2013, 10 pages, http://citeseerx.ist.psu.edu/viewdoc/download?doi=10.1.1.175.2328&rep=rep1&type=pdf.

"International Preliminary Report on Patentability Received for PCT Application No. PCT/US2014/035992", Mailed Date: Jul. 10, 2015, 6 Pages.

* cited by examiner

SEARCH RESULT TAGGING

BACKGROUND

Many users discover, explore, and/or interact with content exposed by a search engine (e.g., search functionality associated with websites, email services, social networks, databases, image sharing services, app stores, marketplaces, file systems, and/or other content sources). In an example, a user may search for a particular email using search functionality of an email application. In another example, a user may search for pictures, videos, and/or other user content shared by friends through a social network. In another example, a user may search for content, such as images, videos, articles, websites, and/or a wide variety of other content, through a search engine such as a search engine app or a search website. In this way, a search engine may provide search results corresponding to content that may be relevant to a search query submitted by a user. A user may perform a search task over multiple search sessions using one or more devices (e.g., the user may search for vacation destinations using a work laptop Monday morning, the user may search for vacation resorts using a tablet device Monday night, the user may search for sightseeing information using a mobile phone Thursday at lunch, etc.). Because search engines may not adequately retain and/or organize search queries or search results for later access, the user may have to manually save and organize search results, otherwise the user may lose track of search results (e.g., on Saturday, the user may desire to see a particular sightseeing search result from Thursday, however, the user may be unable to remember the exact search query that resulted in the search engine providing the particular sightseeing search result). The inability to save and recall search results from any device for personal consumption and/or the inability to share such search results between users may result in a diminished user experience.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for tagging search results, organizing tagged search results into tag collections, maintaining tag collections, and/or providing targeted content based upon tagged search results are provided herein. A search result may correspond to a wide variety of content associated with a user searching for such content, such as images, social network posts, database entries, URLs, websites, videos, articles, files, emails, social network profiles, items to purchase through a marketplace, and/or other various types of content. The search result may be associated with various types of interfaces such as a web search engine, file search functionality, social network search functionality, email search functionality, and/or other interfaces providing search functionality.

In some embodiments of organizing search results into one or more tag collections, a tag action associated with a first search result may be received. The tag action may correspond to a first tag indicated by a first user. In an example, the first user may have submitted a search query for "vacation destinations". Various search results that may be relevant to the search query may have been provided to the first user. For example, the first search result and a tag suggestion may have been provided (e.g., a Cancun website URL and a tag suggestion of #BestCancunVacationSite may have been provided to the first user). The first user may indicate the first tag by interacting with the tag suggestion, such as through a one-click user input (e.g., the first user may invoke tagging of the first search result (e.g., with the tag suggestion of #BestCancunVacationSite) utilizing a single user input, such as a single touch input, a single mouse click input, a single voice command, a single keyboard input, etc.). In another example, the first user may have created the first tag through a create tag interface (e.g., the first user may create a #VacationIdeas tag). In this way, the first search result may be tagged to create a first tagged search result. In an example, the first tagged search result may be organized into a first personal tag collection corresponding to the first tag (e.g., the first user may have previously tagged one or more search results with #VacationIdeas such that the one or more tagged search results and the first tagged search result are organized into a VacationIdeaspersonal tag collection for later access by the first user from any device, browser, and/or application). In another example, the first tagged search result may be organized into a first public tag collection corresponding to the first tag (e.g., one or more users may have previously tagged search results with the #VacationIdeas tag such that the tagged search results and the first tagged search result are organized into a VacationIdeas public tag collection for later access by users from any device, browser, and/or application).

In some embodiments of facilitating tagging of search results, responsive to receiving a first search query (e.g., through a modal search interface configured to provide search results based upon search queries and/or provide tagged search results based upon tag searches identified by a tag identifier such as #), a set of search results may be provided based upon the first search query. The set of search results may comprise a first search result and/or other search results that may be relevant to the first search query. In an example, a first user may create a first tag for the first search result through a create tag interface. In another example, one or more tag suggestions for the first search result may be provided for selection by the first user. A tag suggestion may specify the first tag that may be selected by the first user for tagging the first search result (e.g., the first tag may correspond to a tag used by other users to tag the first search result). If the first user has not already tagged the first search result with the first tag, then the tag suggestion may be provided in an off state (e.g., a non-highlighted state). If the first user has already tagged the first search result with the first tag, then the tag suggestion may be provided in an on state (e.g., a highlighted state). In an example, multiple tag suggestions may be provided for the first search result and/or for other search results to facilitate tagging of search results. Responsive to receiving a one-click user input (e.g., a single touch input, a single mouse input, a single keyboard input, and/or a variety of other relatively simple inputs), by the first user, associated with the tag suggestion, the first search result may be tagged with the first tag to create a first tagged search result.

The first tagged search result may be organized into a personal tag collection and/or a public tag collection associated with the first tag. For example, a user tagging model, indicative of whether the first user prefers to organize tagged search results into personal tag collections, public tag collections, or both, may be evaluated to determine how to organize the first tagged search result. In this way, the first tagged search result may be personally access by the first user through the first tag collection and/or shared with other users through the first public tag collection. Responsive to tagging the first search result, the tag suggestion may be transitioned from the off state to an on state (e.g., a highlighted state). In an example, a tagging accuracy rating of the first user may be maintained based upon whether the first user tags search results similar to how other users tag such search results. In this way, a tagging badge may be awarded to the first user based upon the tagging accuracy rating.

In some embodiments of maintaining one or more tag collections, responsive to identifying a first user tagging a first search result with a first tag, a first personal tag collection may be generated for the first tag. If the first user is already associated with the first personal tag collection for the first tag, then the first personal tag collection may be selected for use, otherwise the first personal tag collection may be created and designated for storage of one or more tagged search results that are tagged by the first user with the first tag. In this way, the first search result may be organized as a first tagged search result into the first personal tag collection for later access by the first user (e.g., responsive to the first user tagging a running website search result with a #SummerGetFit tag, the tagged running website search result may be organized into a SummerGetFit personal tag collection used to store tagged search results that are tagged by the first user with the #SummerGetFit tag). In an example of accessing the first personal tag collection, responsive to the first user submitting a first tag search #SummerGetFit, the tagged running website search result and/or other tagged search results that are tagged with the #SummerGetFit tag may be provided to the first user on any device, browser, and/or application (e.g., the first user may have tagged the running website search result on a laptop, and may later access the tagged running website search result from a tablet device).

In an example, the first tagged search result may be organized into a first public tag collection used to store search results tagged with the first tag by one or more users. For example, a SummerGetFit public tag collection may have a tagged running trail image search result tagged by a second user with the #SummerGetFit tag, a tagged exercise video search result tagged by a third user with the #SummerGetFit tag, a tagged soccer club website search result tagged by a fourth user with the #SummerGetFit tag, and/or other tagged search results tagged by other users with the #SummerGetFit tag. In this way, responsive to a user submitting a tag search #SummerGetFit, the tagged search results within the first public tag collection may be provided. Thus, the user may explore content tagged by other users.

In some embodiments of providing targeted content to users based upon tagged search results, a set of personal tag collections may be maintained for a first user. The set of personal tag collections may comprise a first personal tag collection comprising one or more tagged search results tagged by the first user with a first tag (e.g., a tagged running website search result, a tagged basketball image search result, a tagged running group social network post search result, a tagged baseball club social profile search result, and/or a variety of other search results tagged with the #SummerGetFit tag by the first user). In an example, the set of personal tag collections may comprise one or more additional personal tag collections (e.g., a BasementIdeas personal tag collection, a #CarpetColors personal tag collection, a #FunnyFriendPosts personal tag collection, etc.). One or more topics of interest (e.g., a home renovations topic of interest, a humor topic of interest, a fitness topic of interest, etc.) may be identified for the first user based upon various information associated with the first user. In an example, the first topic of interest (e.g., the fitness topic of interest) may be derived from the #SummerGetFit tag. In another example, a second topic of interest (e.g., a running trails topic of interest) may be derived from content of tagged search results that are tagged with the #SummerGetFit tag. In another example, a third topic of interest (e.g., a home renovations topic of interest) may be derived by aggregating one or more tags, such as the #CarpetColor tag and the #BasementIdeas tag. In another example, a fourth topic of interest (e.g., a basement bathroom projects) may be derived from aggregating content of tagged search results from multiple tag collections. In this way, targeted content (e.g., a picture of a basement bathroom, a do-it-yourself renovation video, an exercise studio class advertisement, etc.) may be provided to the first user based upon the one or more topics of interest.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
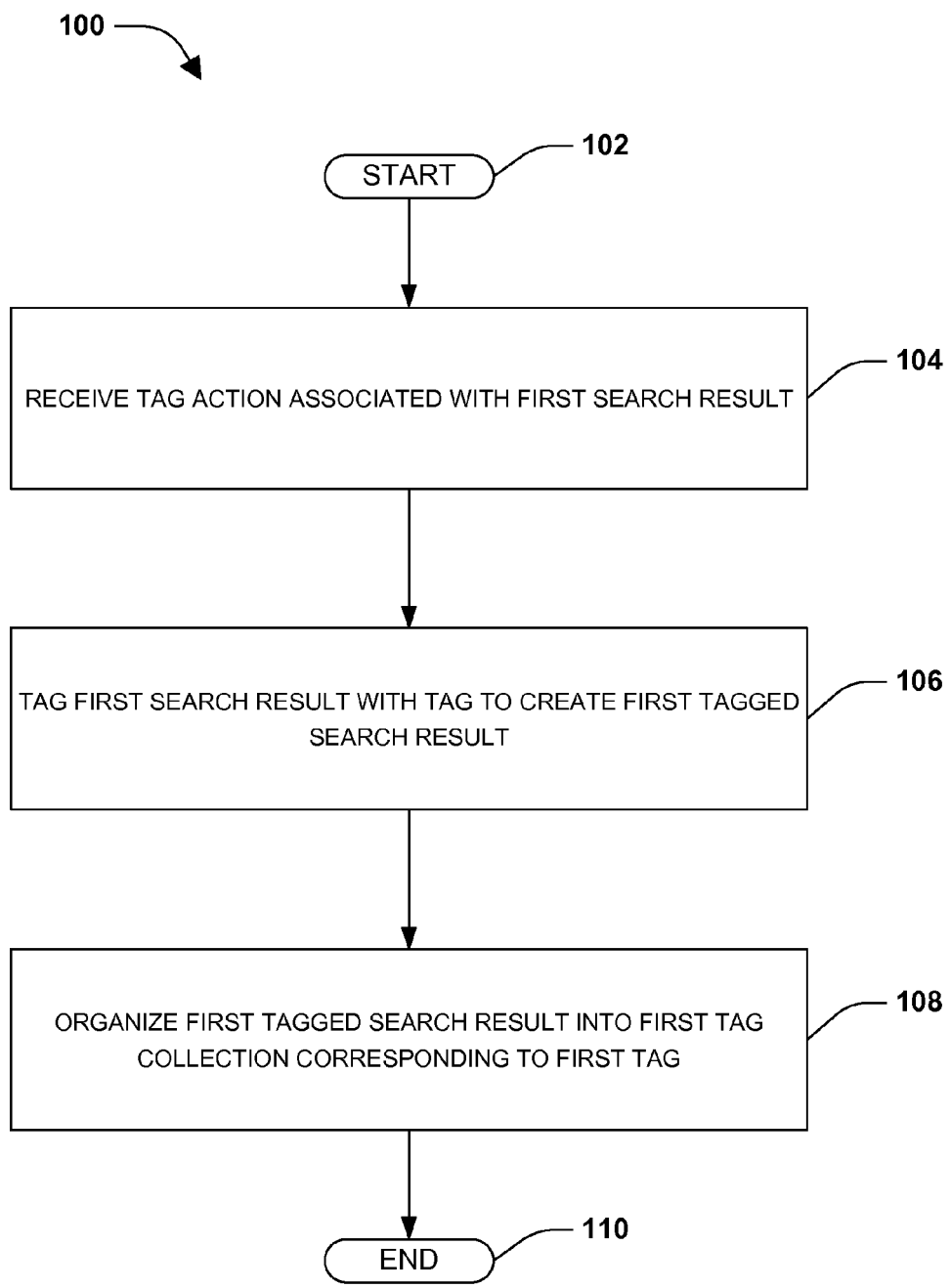
FIG. 1 is a flow diagram illustrating an exemplary method of organizing a search result into one or more tag collections.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of organizing a search result into one or more tag collections is illustrated by an exemplary method 100 of FIG. 1. At 102, the method starts. A search result may comprise various types of content, such as social network content (e.g., multimedia content published through a social network, a social network profile, a social network post, or other social network content that may be identified by search functionality), a website (e.g., a URL to a website provided as a search result by a search engine), an image (e.g., an image provided by a search functionality of an image sharing service), a video, user created content, a URL, multimedia content, and/or a variety of other types of content.

At 104, a tag action associated with a first search result may be received. The tag action may correspond to a first tag indicated by a first user. In an example of receiving a tag action, a search query may have been received from the first user (e.g., "local ice cream shops") through a search interface (e.g., a search interface associated with a file system, an office productivity application, a map application, a search application, a search website, an email application, a website, a social network etc.). A set of search results may be provided based upon the search query (e.g., images, videos, social network posts, social network profiles, driving directions, maps, emails, files, multimedia content, articles, URLs, websites, consumer goods for purchase, applications for purchase, etc.). The set of search results may comprise the first search result. In an example, one or more tag suggestions may be provided for the first search result (e.g., a tag suggestion may be based upon one or more users tagging the first search result with the first tag), such that a user may perform the tag action utilizing a one-click user input associated with a tag suggestion. If the first user had previously tagged the first search result with a tag suggestion, then the tag suggestion may be displayed in an on state (e.g., highlighted), otherwise the tag suggestion may be displayed in an off state (e.g., not highlighted). In another example, a create tag interface may be provided for the first search result, such that the tag action corresponds to a tag created by the first user. In this way, the tag action comprises a first tag (e.g., corresponding to a tag suggestion invoked by a one-click user input by the first user or a tag created by the first user). At 106, the first search result is tagged with the first tag to create a first tagged search result (e.g., the first user may have selected a tag suggestion of a #YummyTreats tag for an ice cream website search result; the first user may have created a #FavoriteDesert tag through the create tag interface for the ice cream website search result; etc.).

At 108, the first tagged search result is organized into a first tag collection corresponding to the first tag. In an example, the first tagged search result is organized into a first personal tag collection comprising one or more tagged search results that are tagged with the first tag by the first user (e.g., a tagged cupcake image search result, a tagged winery website search, and/or other tagged search results tagged with the #YummyTreats tag by the first user). In this way, the first user may access (e.g., recall) tagged search results within the first personal tag collection from any device, application, and/or browser by performing a first tag search #YummyTreats (e.g., the first tagged search result may have been tagged through a laptop device by the first user, and may be later accessed by the first user through a mobile phone).

In another example, the first tagged search result is organized into a first public tag collection comprising one or more tagged search results tagged with the first tag by one or more users (e.g., the first tagged search result may be organized into a YummyTreats public tag collection, into which one or more users may have contributed tagged search results tagged with the #YummyTreats tag, and may be publically available for users to discover and/or explore tagged search results). The first public tag collection may be accessible by one or more users that have contributed to the first public tag collection and/or users that have not so contributed, which may promote exploration of new search results and/or content by users. For example, a second user (e.g., whom has not tagged a search result with #YummyTreats, but may be planning an upcoming party and is seeking out ideas from other users) may submit a tag search #YummyTreats in order to discover tagged search results that other users have tagged with #YummyTreats. In this way, the first public tag collection may be provided to the second user. At 110, the method ends.

Figure 2A:
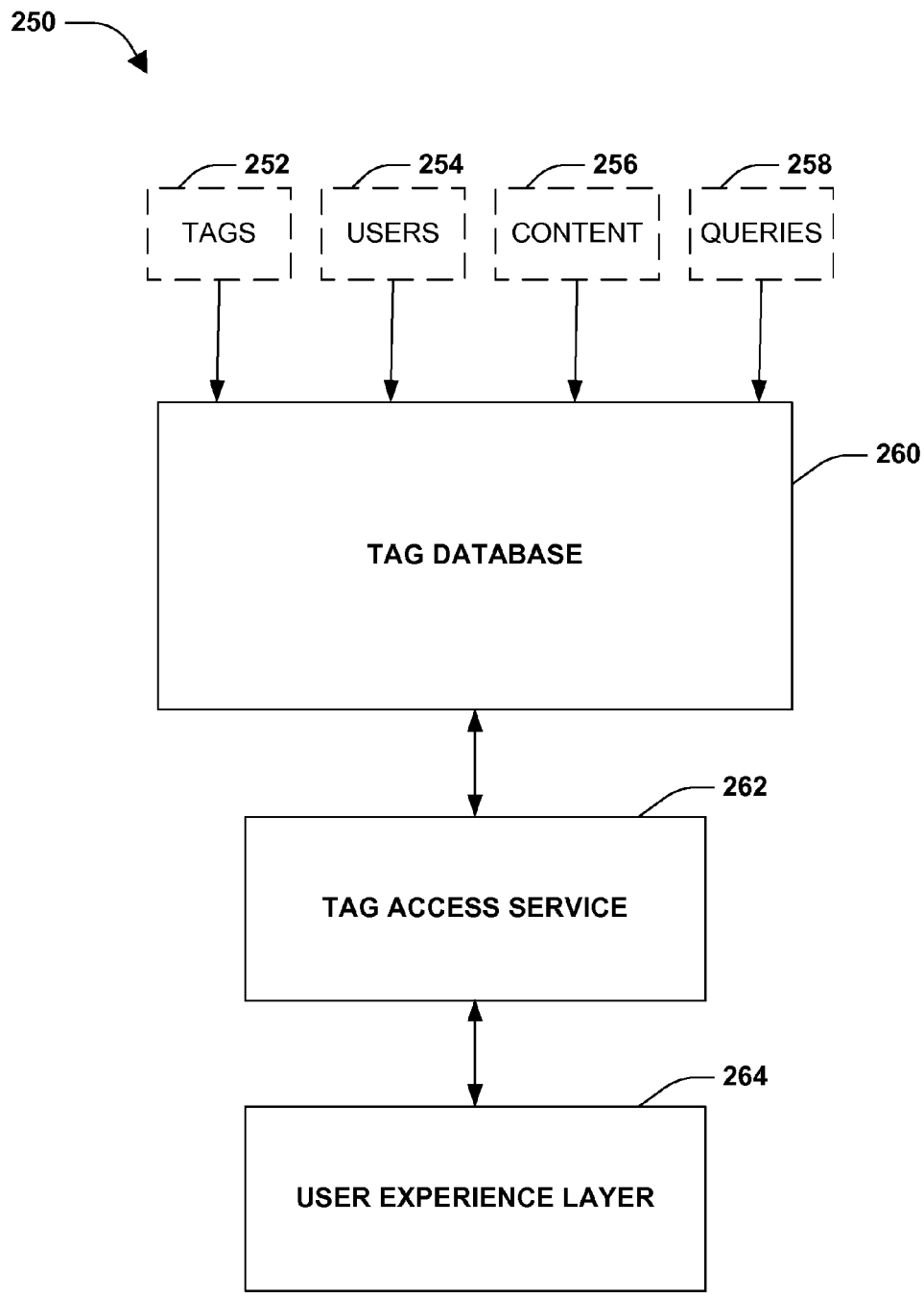
FIG. 2A is a component block diagram illustrating an exemplary system for maintaining data related to tagging.

FIG. 2A illustrates an example of a system 250 configured for maintaining data related to tagging (e.g., a data model for user tag accessibility). The system 250 may comprise a tag database 260 (e.g., and/or other data storage structure). The tag database 260 may be configured to store various information related to tagging content, such as tagged search results (e.g., according to a tagging data model implementing a database, tables, schemas, stored procedures, and/or other techniques, mechanisms, etc. for organizing information related to tagged content). In an example, the tag database 260 may store tag information 252 associated with one or more tags used to tag content by users. In another example, the tag database 260 may store user information 254 associated with users that have tagged content and/or accessed tagged content. In another example, the tag database 260 may store content information 256 associated with content, such as tagged search results (e.g., tagged by users within the user information 254 using tags within the tag information 252). In another example, the tag database 260 may store query information 258 corresponding to queries submitted by users to identify content within the content information 256. In this way, information related to tags used by users to tag content related to (e.g., resulting from) search queries submitted by the same and/or different users may be stored by the tag database 260 (e.g., data corresponding to information within 252, 254, 256 and/or 258 and/or data corresponding to interrelationships between information within 252, 254, 256 and/or 258 may be stored within the tag database).

The system 250 may comprise a tag access service 262 and/or a user experience layer 264. In one example, the tag access service 262 may comprise a database proxy, a web service, or other functional component configured to submit data (e.g., queries) to the tag database 260 and/or retrieve data from the tag database 260. In this way, the tag access service 262 may provide the user experience layer 264 with access to the tag database 260. The user experience layer 264 may be configured to provide a visual representation of the tagging data model (e.g., a visualization of the tag information 252, user information 254, content information 256, and/or query information 258). The user experience layer 264 may be configured to provide an interactive user interface (e.g., through the tag access service 262) to the tagging data model. In this way, a user may interact with the tagging data model through the interactive user interface (e.g., the user may explore, organize, perform database operations such as join operations, and/or modify tag information 252, user information 254, content information 256, and/or query information 258).

Figure 2B:
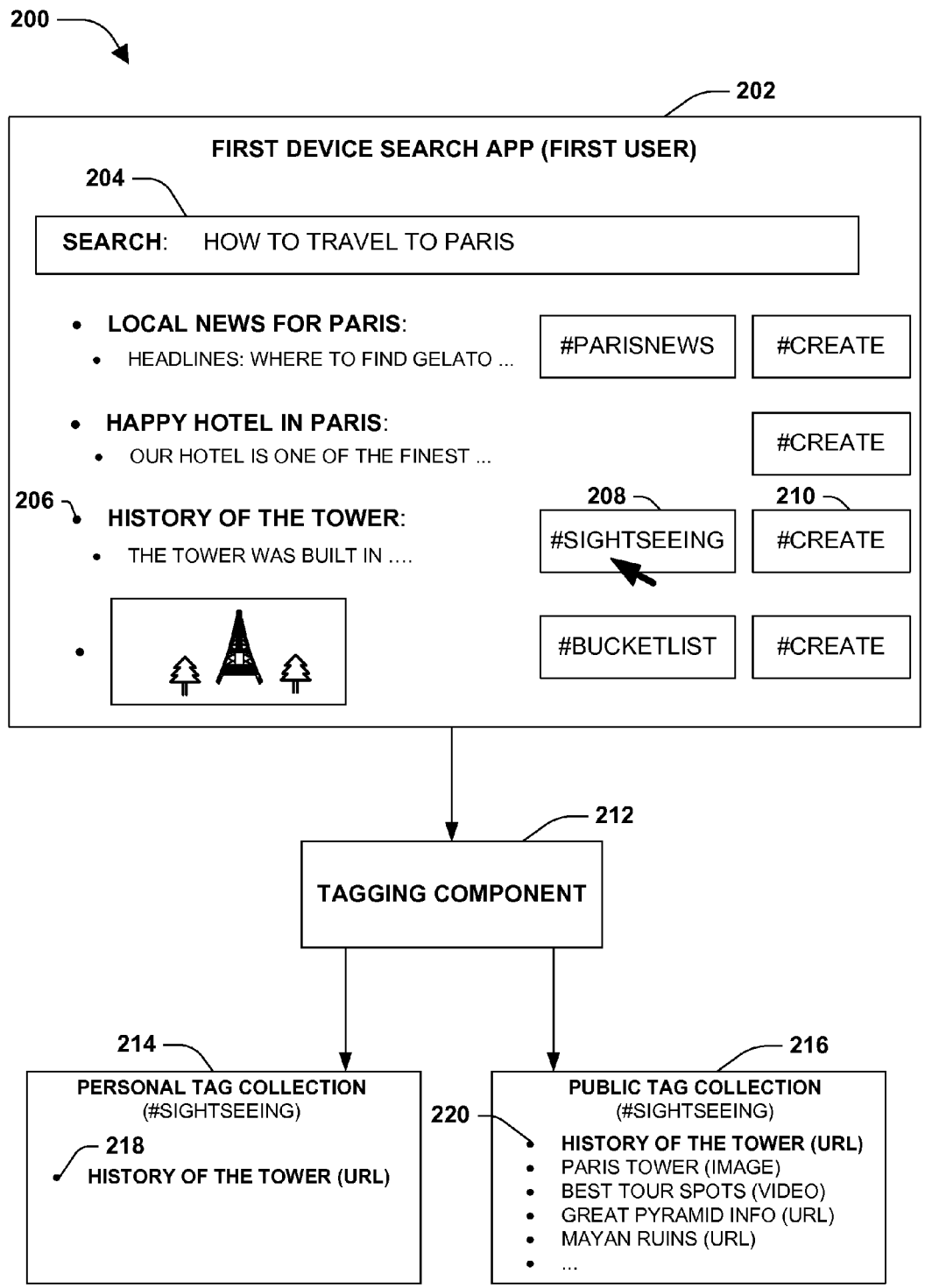
FIG. 2B is a component block diagram illustrating an exemplary system for organizing a search result into one or more tag collections.

FIG. 2B illustrates an example of a system 200 configured for organizing a search result into one or more tag collections. The system 200 may comprise a tagging component 212 associated with a search app 202 accessible to a first user through a first device (e.g., a laptop). In an example, the first user may submit a search query 204 "how to travel to Paris". A set of search results may be provided based upon the search query 204, such as a local Paris news article search result, a Happy Hotel in Paris search result, a history of the tower search result 206, a tower in Paris image search result, etc. A create tag interface may be provided for respective search results within the set of search results, such as a create tag interface 210 through which the first user may create a tag for tagging the history of the tower search result 206. In an example, a tag suggestion may be provided for a search result. For example, a tag suggestion of #ParisNews may be provided for the local Paris news article search result (e.g., based upon one or more users tagging the local Paris news article search result with a #ParisNews tag). No tag suggestion may be provided for the Happy Hotel in Paris search result because no users have tagged the Happy Hotel in Paris search result. A tag suggestion of #BucketList may be provided for the tower in Paris image search result (e.g., based upon one or more users tagging the tower in Paris image search result with a #BucketList tag). A tag suggestion 208 of #SightSeeing may be provided for the history of the tower search result 206 (e.g., based upon on one or more users tagging the history of the tower search result 206 with a #SightSeeing tag).

In an example, a tag action associated with the tag suggestion 208 of #SightSeeing may be received by the tagging component 212. For example, the first user may have used a one-click user input (e.g., a single touch input, a single mouse click, a single keyboard input, etc.) to invoke the tag action. The one-click user input may allow the first user to tag the history of the tower search result 206 with a #SightSeeing tag without having to provide multiple user input and/or complex user input such as through navigation of a menu. In this way, the tagging component 212 tags the history of the tower search result 206 with the #SightSeeing tag to create a tagged history of the tower search result (e.g., a tagged history of the tower search result 218 and/or a tagged history of the tower search result 220). In an example, the tagging component 212 may organize the tagged history of the tower search result 218 into a Sight-Seeing personal tag collection 214 designated for storage of tagged search results that are tagged by the first user with the #SightSeeing tag (e.g., the tagging component 212 may create the SightSeeing personal tag collection 214 based upon the tag action where no personal tag collection exists for the first user with regard to the #SightSeeing tag, or the tagging component 212 may include the tagged history of the tower search result 218 in the SightSeeing personal tag collection 214 if the SightSeeing personal tag collection 214 already exists). In this way, the first user may access the tagged history of the tower search result 218 through the SightSeeing personal tag collection 214 from any device, browser, and/or application. In another example, the tagging component 212 may organize the tagged history of the tower search result 220 into a SightSeeing public tag collection 216 designated for storage of tagged search results with the #SightSeeing tag by one or more users (e.g., a second user may have tagged a Paris tower image search result with the #SightSeeing tag, a third user may have tagged a best tour spots video search result with the #SightSeeing tag, etc.). In this way, one or more users may access the SightSeeing public tag collection 216 to discover and/or explore various tagged search results (e.g., that are tagged with the #Sight-Seeing tag).

Figure 3:
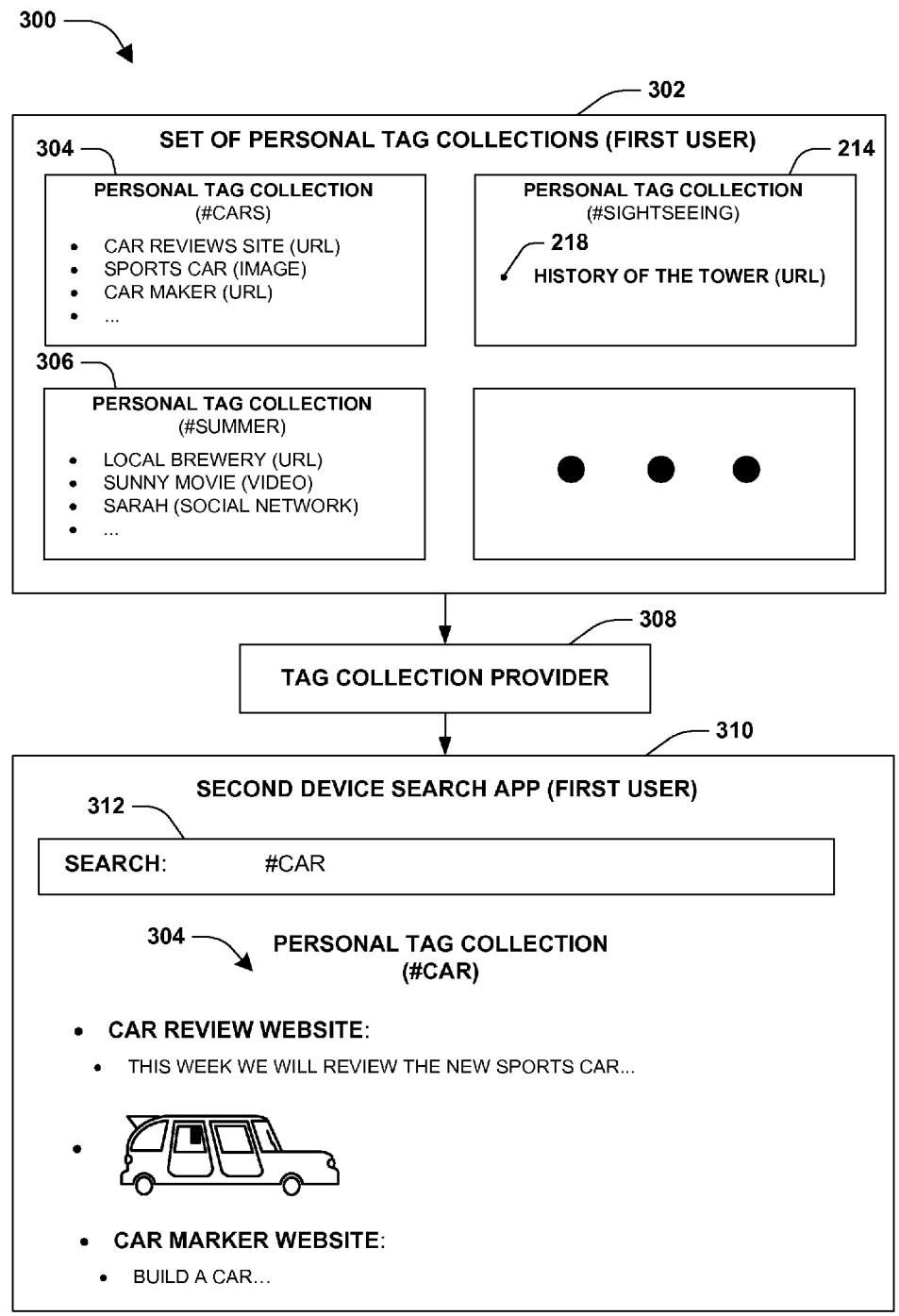
FIG. 3 is a component block diagram illustrating an exemplary system for providing access to a set of personal tag collections.

FIG. 3 illustrates an example of a system 300 for providing access to a set of personal tag collections 302. The system 300 may comprise a tag collection provider 308 (e.g., a personal tag collection provider). The tag collection provider 308 may access the set of personal tag collections 302 associated with a first user. The set of personal tag collections 302 may comprise a Cars personal tag collection 304 comprising one or more tagged search results tagged by the first user with a #Cars tag (e.g., a tagged car reviews site search result tagged with the #Cars tag by the first user through a first application on a first device, a tagged sports car image search result tagged with the #Cars tag by the first user through a third device, a tagged car maker search result tagged with the #Cars tag by the first user through a second application of the first device, etc.), a Summer personal tag collection 306 comprising one or more tagged search results tagged by the first user with a #Summer tag, a SightSeeing personal tag collection 214 comprising a tagged history of the tower search result 218 (e.g., tagged by the first user through the first device as illustrated by FIG. 2B), and/or other personal tag collections not illustrated.

A second device (e.g., different than the first device and/or the third device through which the first user tagged at least some of the tagged search results within the Cars personal tag collection 304) may host a search app 310. The search app 310 may provide a modal search interface through which the first user may submit search queries for search results and/or submit tag searches for tagged search results (e.g., a tag search may comprise a tag identifier, such as #, that differentiates the tag search from a search query). In an example, the tag collection provider 308 may receive a car tag search 312 submitted through the search app 310 by the first user. The car tag search 312 comprises a #Car tag that corresponds to the Cars personal tag collection 304. Accordingly, the tag collection provider 308 may provide the first user with access to the Cars personal tag collection 304 through the second device. In this way, the first user may access (e.g., recall) tagged search results without having to manually recall one or more search queries used to initially identify such tagged search results (e.g., the first user may access tagged search results, which may have been tagged over multiple days using different devices, by merely submitting the car tag search 312, instead of remember and/or resubmitted a search query that lead to the discovery of the tagged car reviews site search result, the tagged sports car image search result, and/or the tagged car maker search result).

Figure 4:
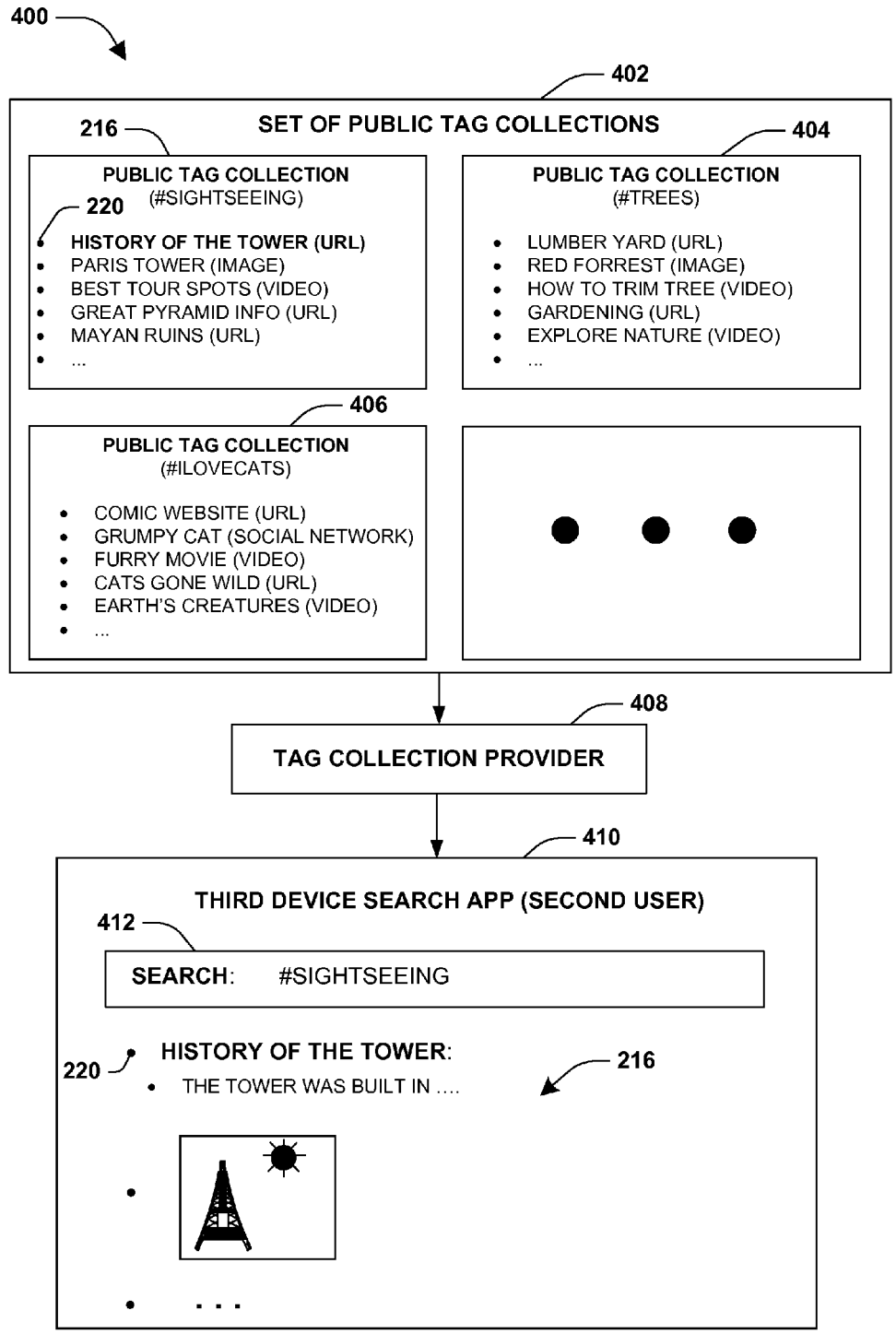
FIG. 4 is a component block diagram illustrating an exemplary system for providing access to a set of public tag collections.

FIG. 4 illustrates an example of a system 400 for providing access to a set of public tag collections 402. The system 400 may comprise a tag collection provider 408 (e.g., a public tag collection provider). The tag collection provider 408 may be associated with the set of public tag collections 402. The set of public tag collections 402 may comprise a plurality of public tag collections contributed to by one or more users, such as a SightSeeing public tag collection 216, a Trees public tag collection 404, an ILoveCats public tag collection 406, and/or a wide variety of other public tag collections not illustrated. In an example, one or more users may have contributed to the SightSeeing public tag collection 216 (e.g., a first user may have tagged a tagged history of the tower search result 220 from a first device, a second user may have tagged a tagged Paris tower image search result from a second device, etc.).

A third device may host a search app 410. The search app 410 may provide a modal search interface through which a third user may submit search queries for search results and/or submit tag searches for tagged search results. In an example, the tag collection provider 408 may receive a tag search 412, corresponding to a #SightSeeing tag, submitted through the search app 410 by the third user. Accordingly, the tag collection provider 408 may provide the third user with access to the SightSeeing public tag collection 216 through the third device. In this way, the third user may explore tagged search results that may have been tagged by the third user and/or other users (e.g., the third user may explore the SightSeeing public tag collection 216 in order to obtain ideas for an upcoming vacation regardless of whether the third user has or has not tagged a search result with the #SightSeeing tag).

Figure 5:
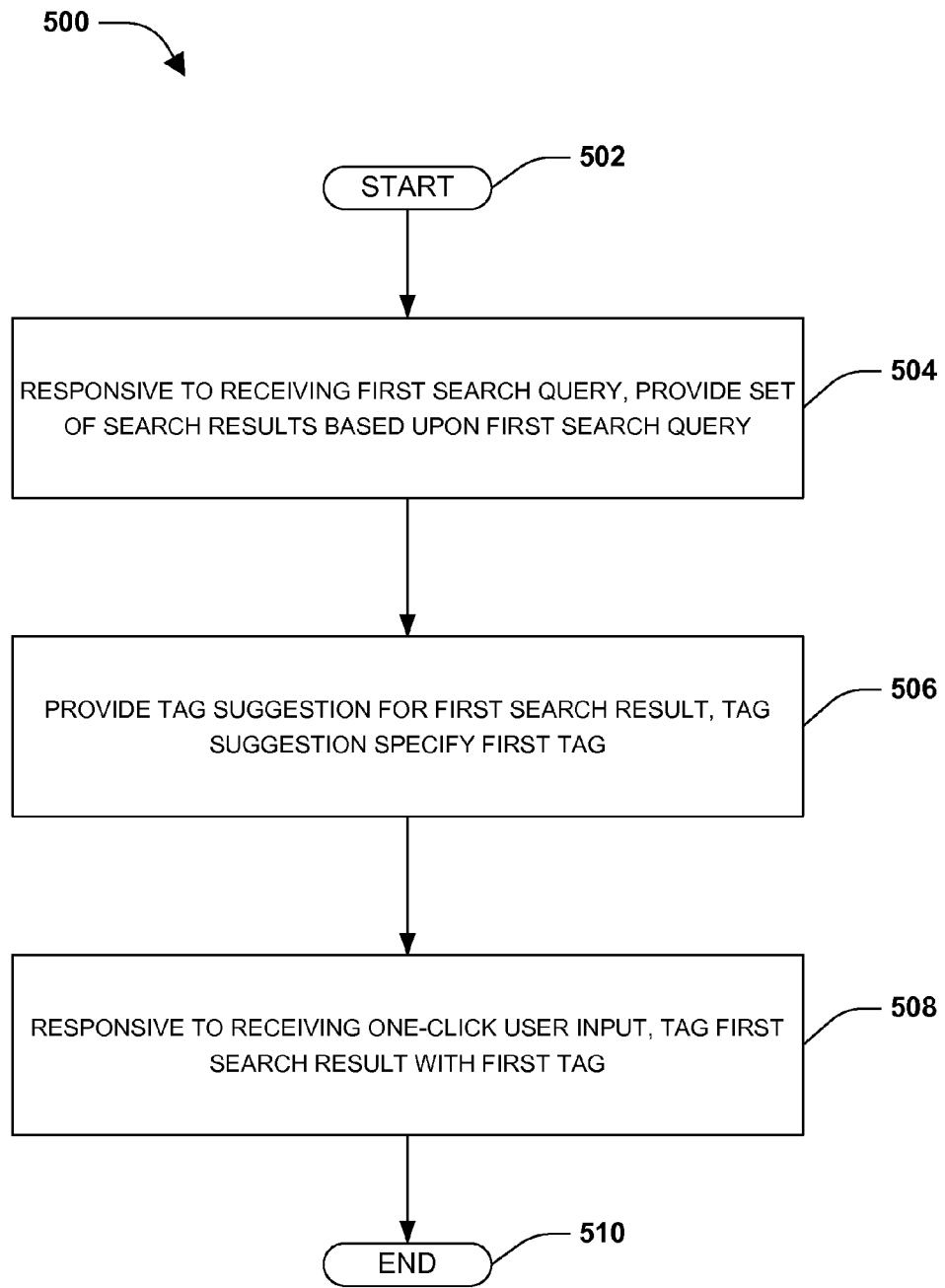
FIG. 5 is a flow diagram illustrating an exemplary method of facilitating tagging of search results.

An embodiment of facilitating tagging of search results is illustrated by an exemplary method 500 of FIG. 5. At 502, the method starts. At 504, responsive to receiving a first search query, a set of search results may be provided based upon the first search query. For example, a first user may submit a first search query "vacations", and may be presented with one or more search results that may be relevant to "vacations" (e.g., a beach image search result, a social network vacation post search result, a vacation destination video search result, a vacation itinerary email search result, etc.). The set of search results may comprise a first search result (e.g., the vacation destination video search result), a second search result (e.g., a travel agency social network profile search result), and/or other search results.

One or more tag suggestions may be provided for the set of search results. For example, a tag suggestion may be provided for the first search result, at 506. The tag suggestion may specify a first tag. For example, a tag suggestion of #FunTravelVideo, specifying a #FunTravelVideo tag, may be provided for the vacation destination video search result (e.g., the tag suggestion may be based upon FunTravelVideo personal tag collections of users and/or a FunTravelVideo public tag collection). In an example, the tag suggestion may be based upon a FunTravelVideo personal tag collection, of a second user, indicating that the second user tagged the vacation destination video search result with the #FunTravelVideo tag. In another example, the tag suggestion may be based upon a FunTravelVideo public tag collection indicating that a plurality of users tagged the vacation destination video search result with the #FunTravelVideo tag. If the first user has not yet tagged the vacation destination video search result with the #FunTravelVideo tag, then the tag suggestion of #FunTravelVideo may be displayed in an off state (e.g., not highlighted), otherwise, the tag suggestion of #FunTravelVideo may be displayed in an on state (e.g., highlighted). In an example, multiple tag suggestions may be provided for the first search result. For example, a second tag suggestion may be provided for the first search result. The second tag suggestion may specify a second tag. For example, a second tag suggestion of #BeachVideo may be provided for the vacation destination video search result. In an example, tag suggestions may be provided for multiple search results within the set of search results (e.g., one or more tag suggestions may be provided for the second search result, one or more tag suggestions may be provided for a third search result, etc.).

At 508, responsive to receiving a one-click user input (e.g., a single user input or other relatively simple user input as opposed to the first user having to navigate menus and/or having to perform multiple inputs to tag a search result) of the tag suggestion by the first user, the first search result may be tagged with the first tag to create a first tagged search result. For example, the vacation destination video search result may be tagged with the #FunTravelVideo tag to create a tagged destination video search result based upon a single input by the first user (e.g., the first user may merely touch or click the tag suggestion of #FunTravelVideo). In an example, the first tagged search result is organized into a first personal tag collection configured to store one or more tagged search results that are tagged by the first user with the first tag. For example, the first tagged search result may be organized into the first personal tag collection based upon a user tagging model indicating a personal preference of the first user to organize tagged search results into personal tag collections. In another example, the first tagged search result may be organized into a first public tag collection configured to store one or more tagged search results that are tagged by one or more users with the first tag. For example, the first tagged search result may be organized into the first public tag collection based upon the user tagging model indicating a public sharing preference of the first user to organize tagged search results into public tag collections.

In some embodiments, the first user may privately share the first tagged search result with one or more users. In an example, the first user may send a link for the first tagged search results to a second user such that the second user (e.g., but not other users) may view the first tagged search result. In another example, a private share setting may be received from the first user. The private share setting may specify one or more users as having access to the first tagged search result. In this way, the first tagged search result may be (e.g., selectively, controllably, etc.) exposed for user access based upon the private share setting.

In some embodiments, the first tagged search result and/or other tagged search results may be available (e.g., for relatively immediate availability) for access from any browser and/or any device with or without user authentication. In an example, the first user may access the first tagged search result and/or other similarly tagged search results from a device (e.g., a public device into which the first user may not want to submit login credentials) by submitting a tag query #FunTravelVideo @FirstUser into a browser or other type of search mechanism on the device. In another example, the first user may login to access the first tagged search result and/or other tagged search results tagged by the first user. In this manner, a user is able to access tagged content in a desired manner (e.g., quickly, on any device, through any browser, with or without providing login credentials, etc.).

In some embodiments, the first user (e.g., or a user authorized by the first user or an administrator) may perform various organization functionality associated with tagged search results. In an example, the user may un-tag the first tagged search result and/or delete the first tagged search result. In another example, the first user may add context to a tag by providing a comment field comprising a description for the tag. In another example, the first user may add context to a tagged search result by providing a comment field comprising a description for the tagged search result.

In some embodiments, users may follow tagging activity of other users. For example, a second user may follow the first user such that the second user may receive notifications when the first user tags search results, such as the first tagged search result. In some embodiments, users may follow tagging activity associated with a particular tag. For example, the first user may receive notifications of tagging activity when other users use the first tag. The first user may 'subscribe' to receive such notifications and/or may receive such notifications in an automated fashion based upon the first user tagging the search result with the first tag. In this way, users may privately, personally, and/or publically access, organize, and/or share tagging information. At 510, the method ends.

Figure 6:
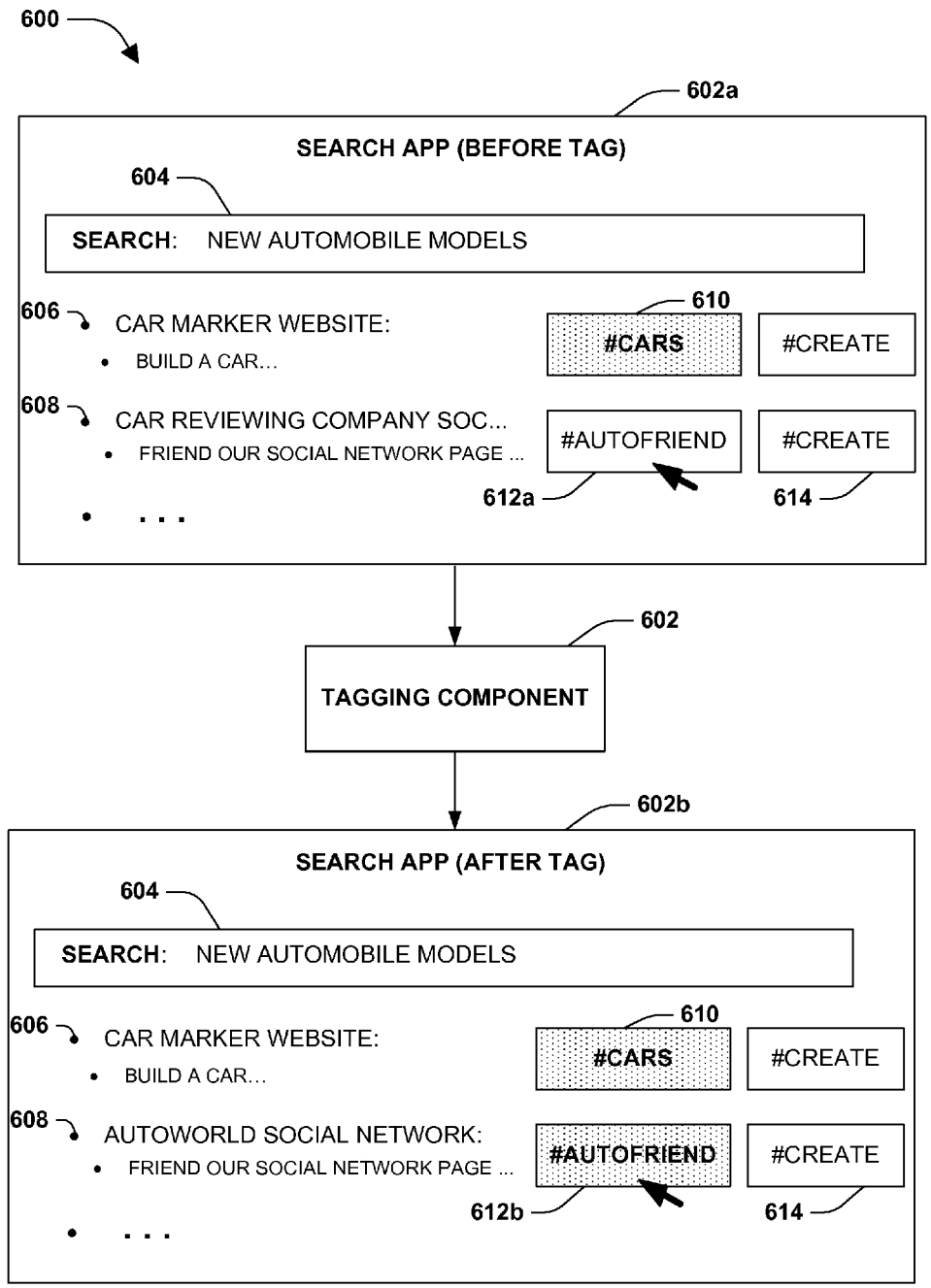
FIG. 6 is a component block diagram illustrating an exemplary system for facilitating tagging of search results.

FIG. 6 illustrates an example of a system 600 configured for facilitating tagging of search results. The system 600 may comprise a tagging component 602. The tagging component 602 may be associated with search functionality, such as a search app 602a before a tagging action by a first user. Responsive to receiving a first search query 604 "new automobile models", the search app 602a may provide a set of search results based upon the first search query 604 "new automobile models". For example, the set of search results may comprise a car maker website search result 606, a car reviewing company social network profile search result 608, and/or other search results not illustrated. The tagging component 602 may provide a tag suggestion 610 of #Cars for the car maker website search result 606. Because the first user may have previously tagged the car maker website search result 606 with a #Cars tag, the tag suggestion 610 of #Cars may be displayed in an on state in order to indicate that the car maker website search result 606 was already tagged by the first user with the #Cars tag. The tagging component 602 may provide a tag suggestion 612a of #AutoFriend for the car reviewing company social network profile search result 608 based upon one or more users having tagged the car reviewing company social network profile search result 608 with an #AutoFriend tag. Because the first user has not tagged the car reviewing company social network profile search result 608 with the #AutoFriend tag, the tag suggestion 612a of #AutoFriend may be displayed in an off state.

Responsive to receiving a one-click user input associated with the tag suggestion 612a of #AutoFriend by the first user, the car reviewing company social network profile search result 608 may be tagged with the #Auto Friend tag. Because the first user has tagged the car reviewing company social network profile search result 608 with the #Auto Friend tag, the tag suggestion 612a of #AutoFriend may be displayed in an on state, as illustrated as tag suggestion 612b of search app 602b. In this way, the first user may tag search results utilizing a single input, as opposed to multiple inputs such as menu navigation, multiple clicks, and/or multiple keystrokes. In some embodiments, the tagging component 602 may provide a create tag interface (e.g., create tag interface 614) through which the first user may create a tag for tagging a search result, as illustrated in FIG. 7.

Figure 7:
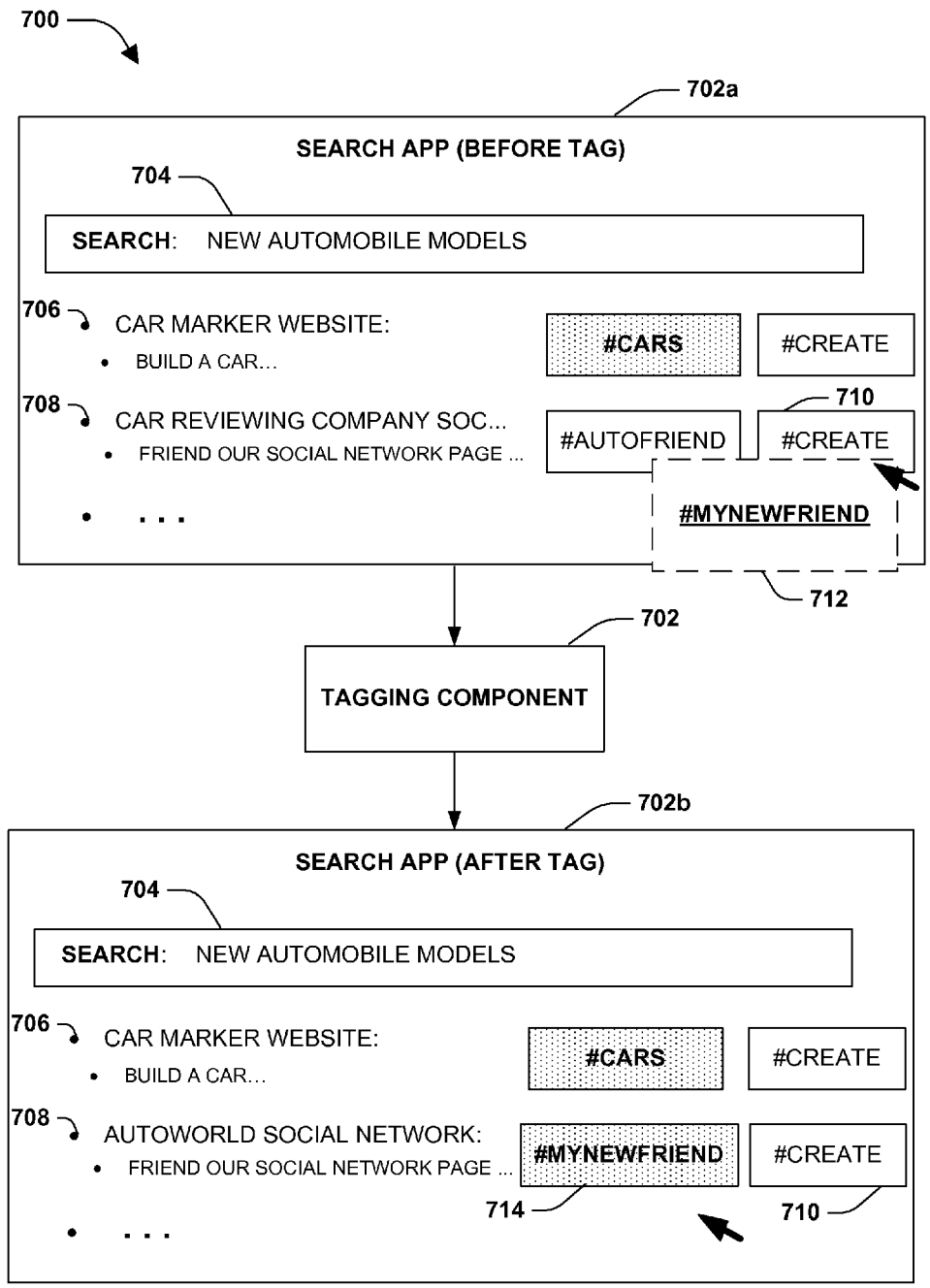
FIG. 7 is a component block diagram illustrating an exemplary system for facilitating tagging of search results.

FIG. 7 illustrates an example of a system 700 configured for facilitating tagging of search results. The system 700 may comprise a tagging component 702. The tagging component 702 may be associated with search functionality, such as a search app 702a before a tagging action by a first user. Responsive to receiving a first search query 704 "new automobile models", the search app 702a may provide a set of search results based upon the first search query 704 "new automobile models". For example, the set of search results may comprise a car maker website search result 706, a car reviewing company social network profile search result 708, and/or other search results not illustrated. The tagging component 702 may provide a tag suggestion of #Cars for the car maker website search result in an on state because the first user may have previously tagged the car maker website search result 706 with the #Cars tag. The tagging component 702 may provide a tag suggestion of #AutoFriend for the car reviewing company social network profile search result 708 in an off state because the first user has not tagged the car reviewing company social network profile search result 708 with the #Auto Friend tag.

The tagging component 702 may provide a create tag interface 710 for the car reviewing company social network profile search result 708. Responsive to receiving a first tag, such as a #MyNewFriend tag 712 created by the first user through the create tag interface 710, the car reviewing company social network profile search result 708 may be tagged with the #MyNewFriend tag 712 to create a tagged car reviewing company social network profile search result 708. Because the first user has tagged the car reviewing company social network profile search result 708 with the #MyNewFriend tag 712, the tag suggestion of #AutoFriend may be transitioned from the off state to an on state, as illustrated as tag suggestion 714 in search app 702b.

Figure 8:
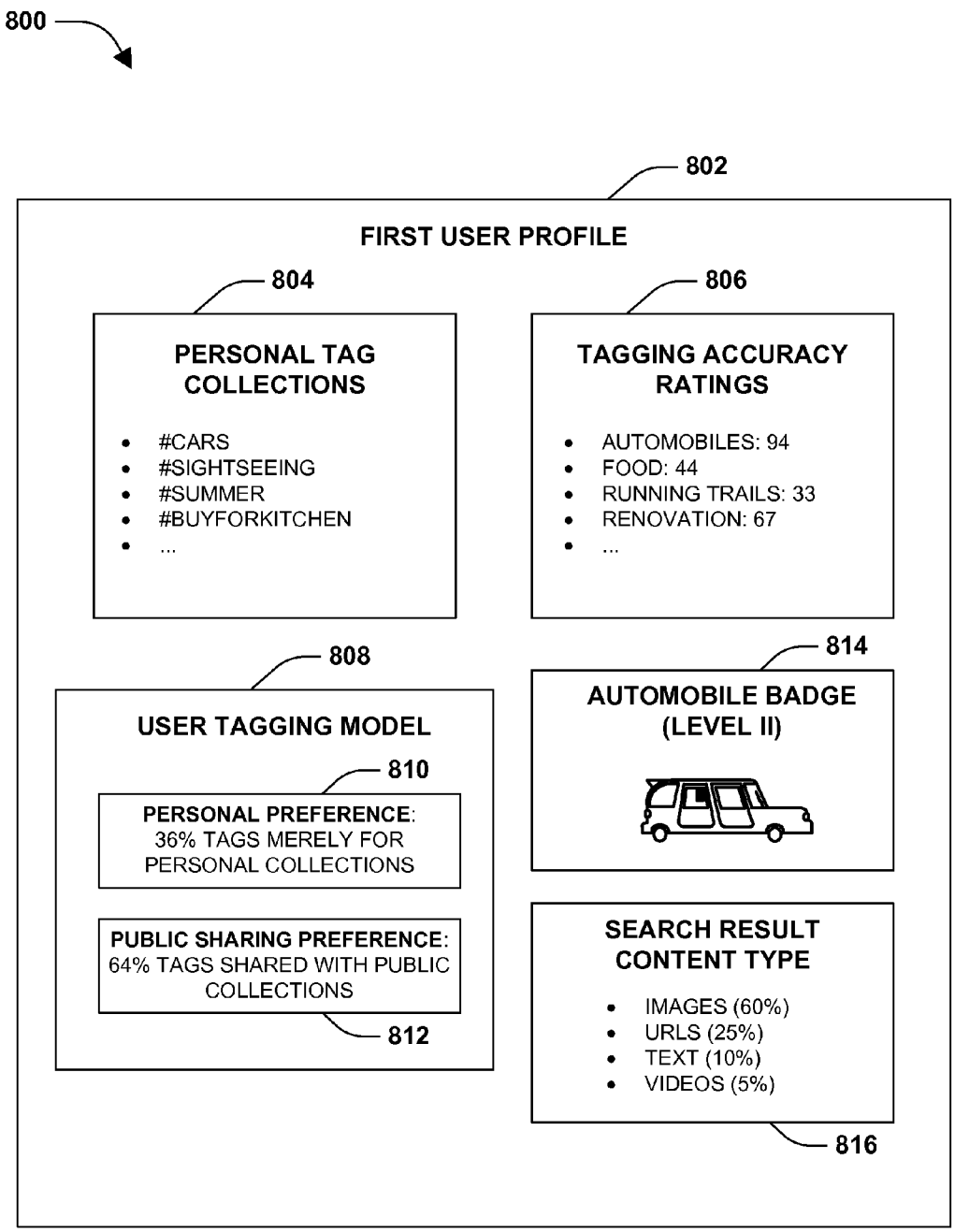
FIG. 8 is an illustration of an example of a first user profile.

FIG. 8 illustrates an example 800 of a first user profile 802. The first user profile 802 may comprise information associated with a first user tagging search results. In an example, the first user profile 802 may comprise a set of personal tag collections 804 comprising one or more personal tag collections associated with the first user, such as a Car personal tag collection comprising one or more search results tagged by the first user with a #Car tag. In another example, first user profile 802 may comprise a set of tagging accuracy ratings 806 comprising one or more tagging accuracy ratings, such as an automobile tagging accuracy rating of 94 indicating that the first user may have a relatively higher accuracy at tagging automobile type search results with tags that are similar to tags used by other users to tag such search results; a renovation tagging accuracy rating of 67 indicating that the first user may have a relatively lower accuracy at tagging renovation type search results (e.g., the first user may tag renovation type search results with tags that are dissimilar to tags used by other users to tag such search results, the first user may use some of the same tags as other users but may tag different search results with those tags, etc.); etc. A tagging accuracy rating may be increased based upon a determination that a threshold number of other users have also tagged a search result with a tag used by the first user to tag the search result (e.g., 90% of users, along with the first user, tagged a sports car image with a car type tag), otherwise, the tagging accuracy rating may be decreased (e.g., 90% of users tagged the sports car image with the car type tag, whereas the first user tagged the sports car image with #MyNewCareer). A badge may be awarded to the first user based upon a tagging accuracy rating being above a badge award threshold. For example, an automobile badge level II 814 may be awarded based upon the automobile tagging accuracy rating of 94.

In another example, a user tagging model 808 may be maintained within the first user profile 802. The user tagging model 808 may comprise a personal preference 810 indicating that the first user prefers to tag search results merely for organization into personal tag collections 36% of the time. The user tagging model 808 may comprise a public sharing preference 812 indicating that the first user prefers to tag search results for organization into public tag collections 64% of the time. In this way, the user tagging model 808 may be evaluated to determine whether a tagged search result, tagged by the first user, is to be organized into a personal tag collection and/or a public tag collection. In another example, a search result content type 816 may be maintained. The search result content type 816 may indicate types of content that the first user tags (e.g., 60% of search results tagged by the first user are images, 25% of search results tagged by the first user are URLs, etc.). The search result content type 816 may be evaluated to determine a layout with which a tag collection is displayed to the first user (e.g., a personal tag collection may be displayed as a magazine layout based upon the search result content type 816 indicating that the first user has tagged a relatively large percentage of images (e.g., the personal tag collection may be displayed as a magazine layout even though the personal tag collection comprises more than merely images, such that a URL, text, etc. are displayed (e.g., formatted) in the magazine layout as an image would be displayed)). Various types of layouts may be used to display a tag collection, such as a magazine layout for images, a video preview layout for videos (e.g., a plurality of video preview tiles used to play videos), a list layout for URLs, a text reader layout for textual information such as articles (e.g., a virtual book), etc.

Figure 9:
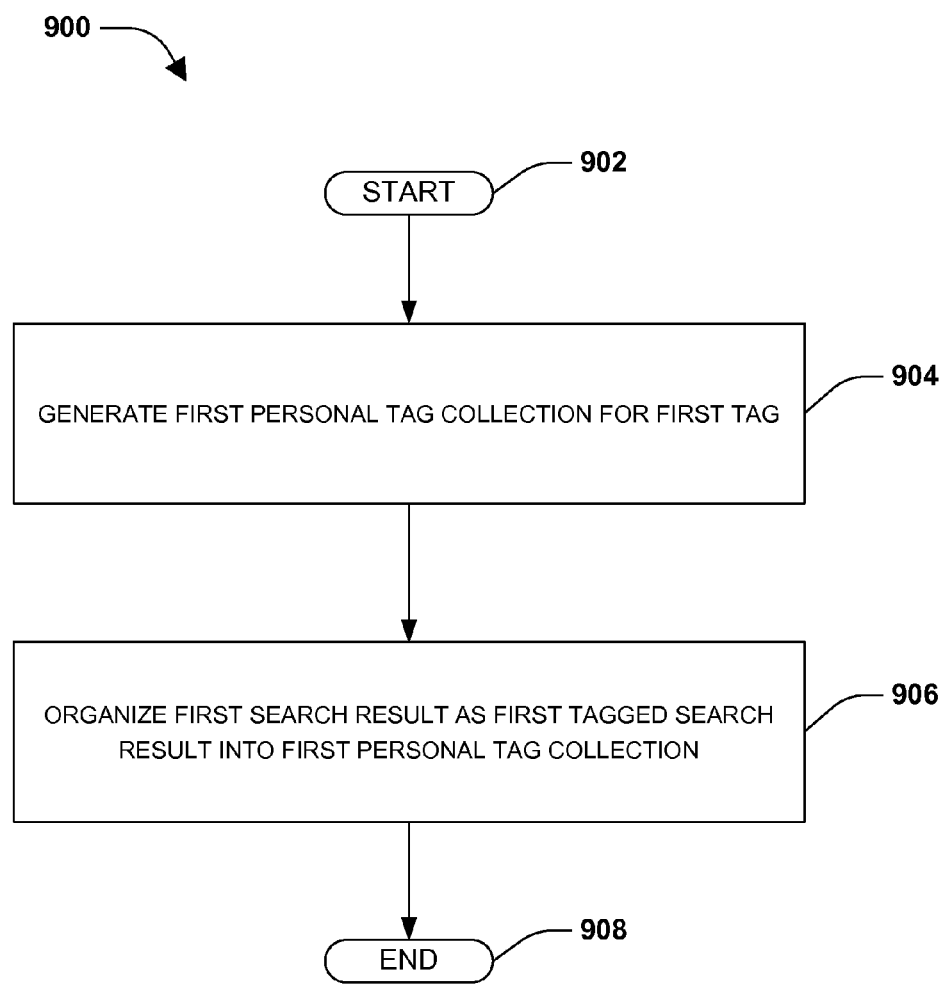
FIG. 9 is a flow diagram illustrating an exemplary method of maintaining one or more tag collections.

An embodiment of maintaining one or more tag collections is illustrated by an exemplary method 900 of FIG. 9. At 902, the method starts. One or more personal tag collections may be created and/or maintained on behalf a first user. At 904, responsive to identifying a first user tagging a first search result with a first tag, a first personal tag collection may be generated for the first tag. For example, the first user may create a #BasementIdeas tag for tagging a home designer website search result. A BasementIdeas personal tag collection may be created for storage of tagged search results that are tagged with the #BasementIdeas tag by the first user. At 906, the first search result is organized into the first personal tag collection as a first tagged search result. In this way, the first user may organize, share, and/or access tagged search results from any device. In an example of organizing multiple tagged search results, responsive to the first user tagging a second search result with the first tag, the second search result may be organized as a second tagged search result into the first personal tag collection (e.g., the first user may tag a carpet image search result with the #BasementIdeas tag).

In some embodiments, one or more personal tag collections may be maintained for the first user. In an example, responsive to identifying the first user tagging a third search result with a second tag, a second personal tag collection may be generated for the second tag. For example, the first user may tag a carpet image search result with a #Flooring tag by performing a one-click user input associated with a tag suggestion of #Flooring. The carpet image search result may be organized as a tagged carpet image search result into a Flooring personal tag collection. The first user may access the one or more personal tag collections through a personal tag collection interface, as illustrated in FIG. 10.

Figure 11:
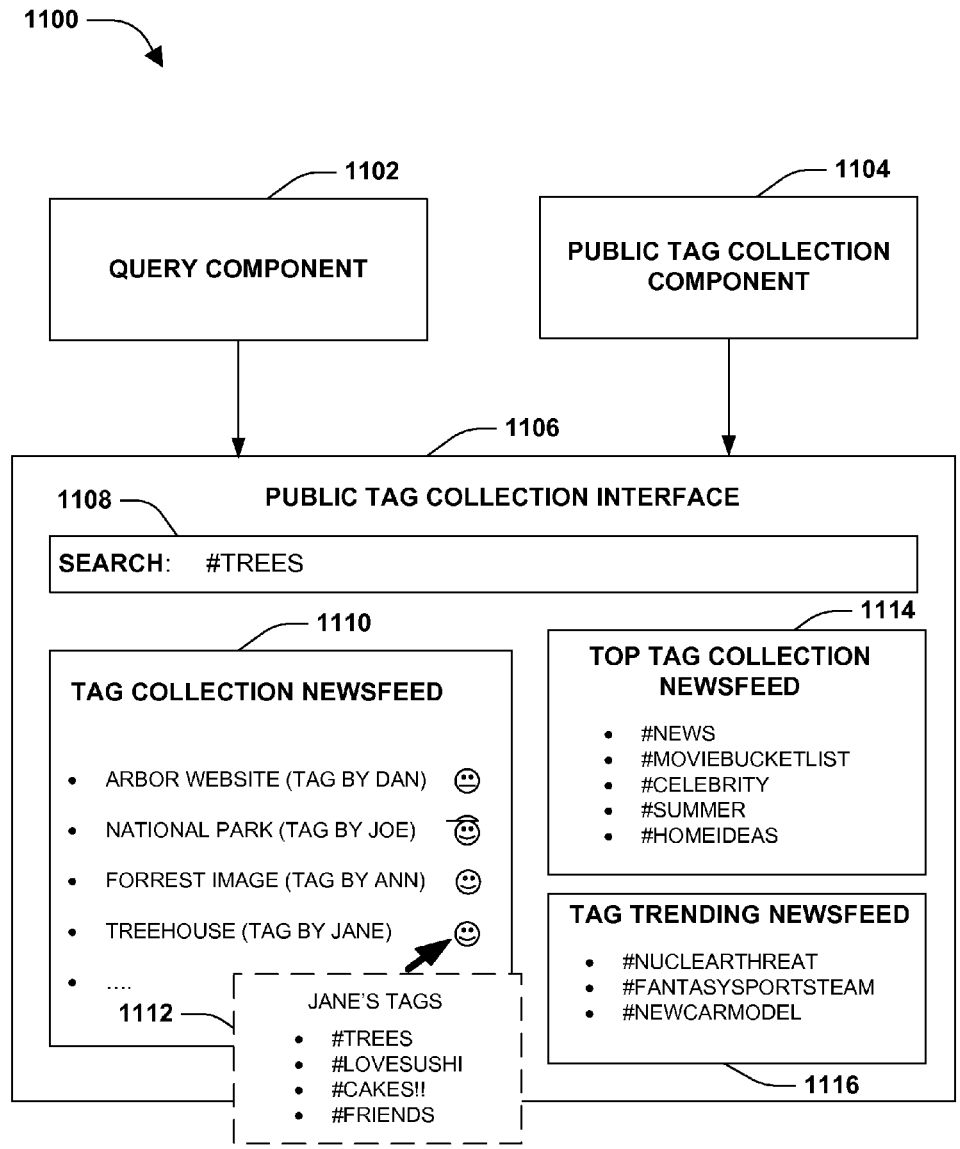
FIG. 11 is a component block diagram illustrating an exemplary system for providing access to one or more public tag collections.

In some embodiments, the first tagged search result may be organized into a first public tag collection associated with the first tag. For example, a BasementIdeas public tag collection may comprise one or more tagged search results that were tagged by one or more users with the #BasementIdeas tag. The BasementIdeas public tag collection may be accessible through a public tag collection interface, as illustrated in FIG. 11. In this way, users may organize, share, and/or explore tagged search content tagged by other users. At 908, the method ends.

Figure 10:
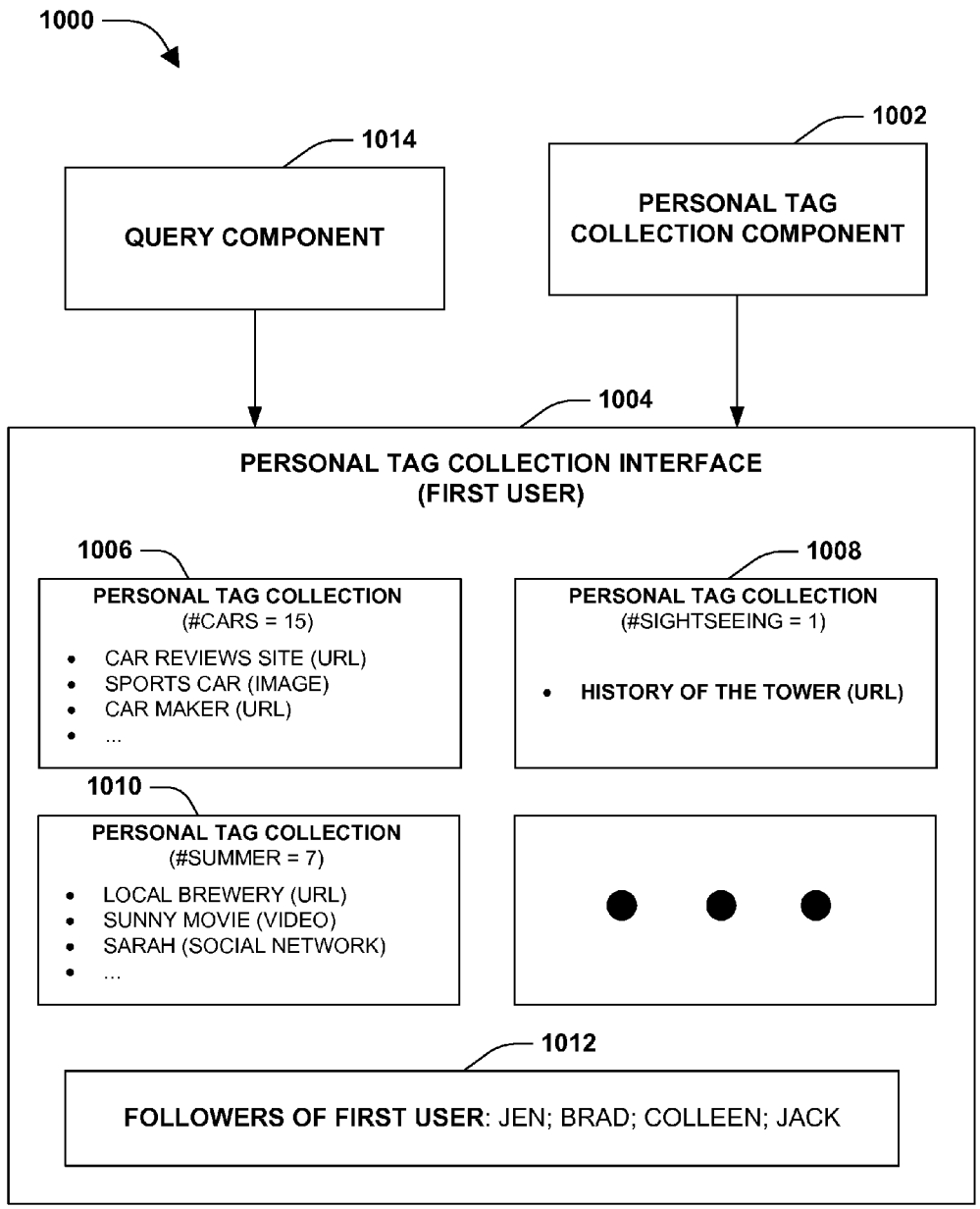
FIG. 10 is a component block diagram illustrating an exemplary system for providing access to one or more personal tag collections.

FIG. 10 illustrates an example of a system 1000 for providing access to one or more personal tag collections. The system 1000 comprises a personal tag collection component 1002 and/or a query component 1014. The personal tag collection component 1002 may be configured to maintain one or more personal tag collections associated with a first user, such as a Cars personal tag collection 1006 (e.g., comprising one or more tagged search results that are tagged with a #Cars tag by the first user), a SightSeeing personal tag collection 1008 (e.g., comprising one or more tagged search results that are tagged with a #SightSeeing tag by the first user), a Summer personal tag collection 1010 (e.g., comprising one or more tagged search results that are tagged with a #Summer tag by the first user), etc.

The personal tag collection component 1002 may be configured to provide the first user with access to the one or more personal tag collections through a personal tag collection interface 1004. In an example, the query component 1014 may be configured to receive a tag search from the first user. The tag search may specify a first tag, such as the #Summer tag. The personal tag collection component 1002 may provide the first user with access to a tagged local brewery search result, a tagged sunny movie search result, a tagged Sarah social network profile search result, and/or other tagged search results organized within the Summer personal tag collection 1010. In another example, the first user may view, sort, and/or share personal tag collections and tagged search results through the personal tag collection interface 1004. In an example, the personal tag collection interface 1004 may provide tag counts associated with respective personal tag collections (e.g., a tag count of 15 may be provided for the Cars personal tag collection 1006 based upon a total count of 15 tagged search results organized into the Cars personal tag collection 1006). In an example, the personal tag collection interface 1004 may provide follower relationship information 1012, such as an indication of what users are following the first user (e.g., tag actions performed by the first user may be displayed in tag news feeds associated with Jen, Brad, Colleen, and Jack).

FIG. 11 illustrates an example of a system 1100 for providing access to one or more public tag collections. The system 1100 may comprise a query component 1102 and/or a public tag collection component 1104. The public tag collection component 1104 may be configured to provide a public tag collection interface 1106 to a first user. The first user may discover and/or explore tagged search results by users through the public tag collection interface 1106 regardless of whether or not the first user contributed to a public tag collection. The query component 1102 may be configured to receive a tag search 1108 specifying a first tag, such as a #Trees tag identified as the tag search 1108 based upon the tag identifier # (e.g., as opposed to corresponding to a general (e.g., non-tag) search query for search results). The public tag collection component 1104 may provide the first user with access, through the public tag collection interface 1106, to a #Trees public tag collection corresponding to the #Trees tag based upon the tag search 1108. In an example, a tag collection newsfeed 1110 may be provided to the first user through the public tag collection interface 1106. The tag collection newsfeed 1110 may comprise one or more tag updates associated with one or more users tagging search results with the #Trees tag (e.g., the one or more tag updates may be displayed according to a temporal ordering such as most recent tag first). Because the first public tag collection may comprise a relatively large amount of tagging information, the tag collection newsfeed 1110 allows the first user to quickly view recent tagging activity, which may be relevant based upon recent user activity.

The public tag collection component 1104 may be configured to display one or more avatars (e.g., an icon or image associated with a user) through the public tag collection interface 1106. An avatar may represent a user that tagged a search result, within the #Trees public tag collection, with the #Trees tag. For example, an image representing Jane (e.g., an avatar for Jane) may be displayed in association with a tagged treehouse search result that Jane tagged with the #Trees tag. Responsive to selection of a first avatar representing a user, one or more tag collections and/or other tagging information associated with the user may be displayed. For example, responsive to selection of the image representing Jane, one or more tags 1112, used by Jane to tag search results, may be displayed (e.g., a #Trees tag corresponding to a Trees personal tag collection, a #LoveSushi tag corresponding to a LoveSushi public tag collection, and/or other tag collections contributed to by Jane).

In an example, a top tag collection newsfeed 1114 may be provided through the public tag collection interface 1106. The top tag collection newsfeed 1114 may comprise one or more tag collections having tag counts above a top tag threshold (e.g., the 5 largest public tag collections). In another example, a tag trending newsfeed 1116 may be provided through the public tag collection interface 1106. The tag trending newsfeed 1116 may comprise one or more tag collections having tag count increases within time spans above a trending threshold. For example, the tag trending newsfeed 1116 may display a #Football tag based upon a relatively large number of users recently contributing to a Football public tag collection during a playoff game.

In an example, the public tag collection component 1104 may be configured to crawl one or more content sources to identify user generated content (e.g., an encyclopedia website through which users may contribute information). A descriptor assigned to user generated content by a content source may be identified (e.g., the encyclopedia website may assign a President descriptor, a political descriptor, and/or a war descriptor to an article regarding how a president started a famous war). A URL comprising the user generated content may be tagged with a tag derived from the descriptor to generate a new tagged search result (e.g., the URL may be tagged with a #President tag). The new tagged search result may be added into a public tag collection for access by one or more users (e.g., a President public tag collection).

Figure 12:
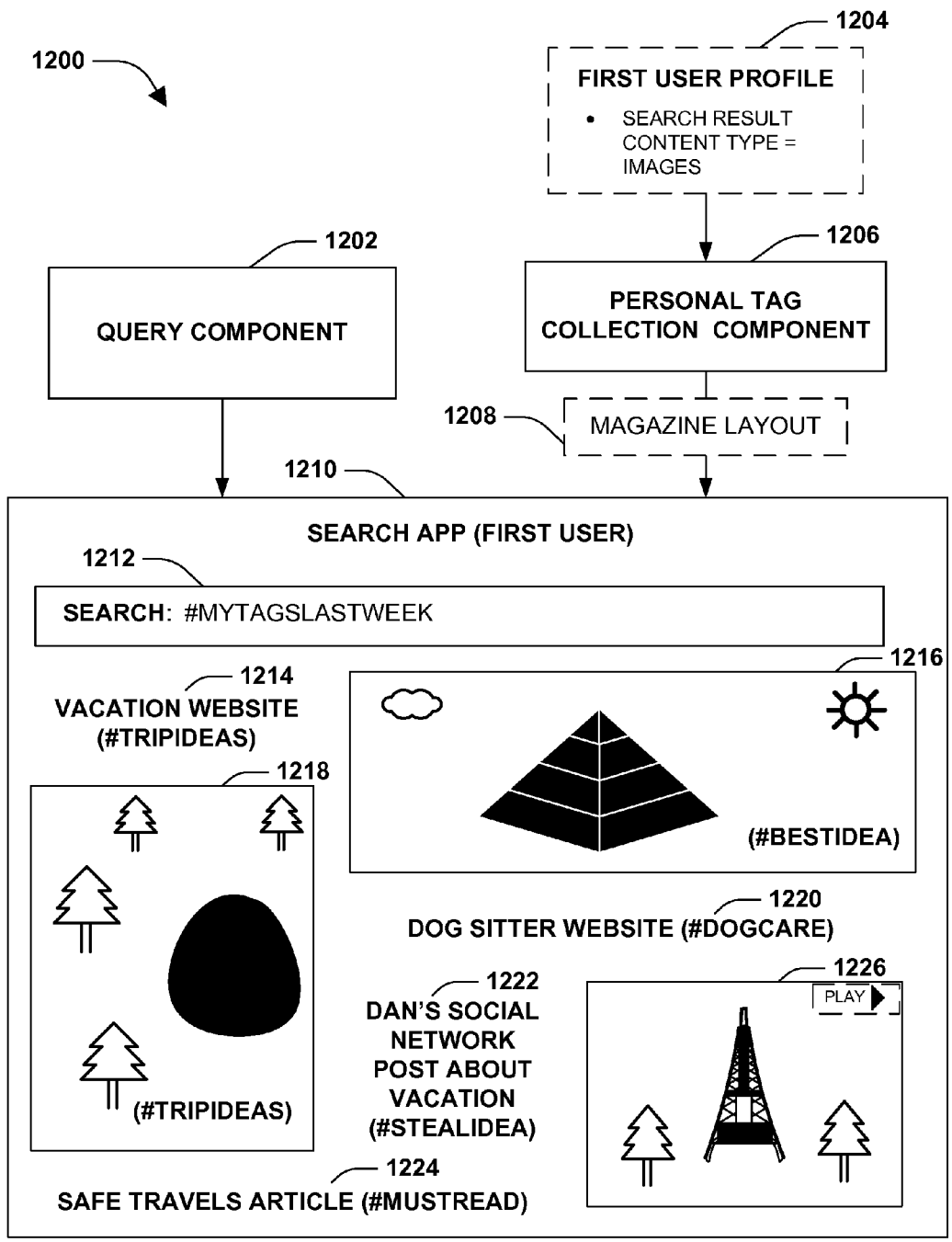
FIG. 12 is a component block diagram illustrating an exemplary system for display a one or more tagged search results according to a visual layout.

FIG. 12 illustrates an example of a system 1200 configured to display a one or more tagged search results according to a visual layout. The system 1200 may comprise a query component 1202 and/or a personal tag collection component 1206. The query component 1202 may be configured to receive a temporal tag search 1212 from a first user (e.g., through a search app 1210). For example, the first user may desire to view tagged search results that the first user tagged last week, and may submit the temporal tag search 1212 of #MyTagsLastWeek through the search app 1210. The personal tag collection component 1206 may be configured to identify one or more tagged search results tagged by the first user within the last week, such as a tagged vacation website search result 1214, a tagged pyramid image search result 1216, a tagged lake image search result 1218, a tagged dog sitter website search result 1220, a tagged social network post search result 1222, a tagged safe travels article search result 1224, and/or a tagged tower video search result 1226. The personal tag collection component 1206 may evaluate a search result content type of a first user profile 1204 for the first user in order to identify a type of content that the first user has a tendency to tag (e.g., the first user has a tendency to tag images more so than other content types). Based upon the search result content type corresponding to images, the personal tag collection component 1206 may display the one or more search results according to a magazine layout 1208 (e.g., even though some of the search results are not images). It may be appreciated that a variety of visual layout types may be used to display search results, such as a text reader layout (e.g., a virtual book layout, a text editor layout, a newspaper layout, etc.), a list layout, a video preview layout (e.g., a plurality of video tiles that the first user may interact with to view videos), a grid layout, and/or combinations thereof.

Figure 13:
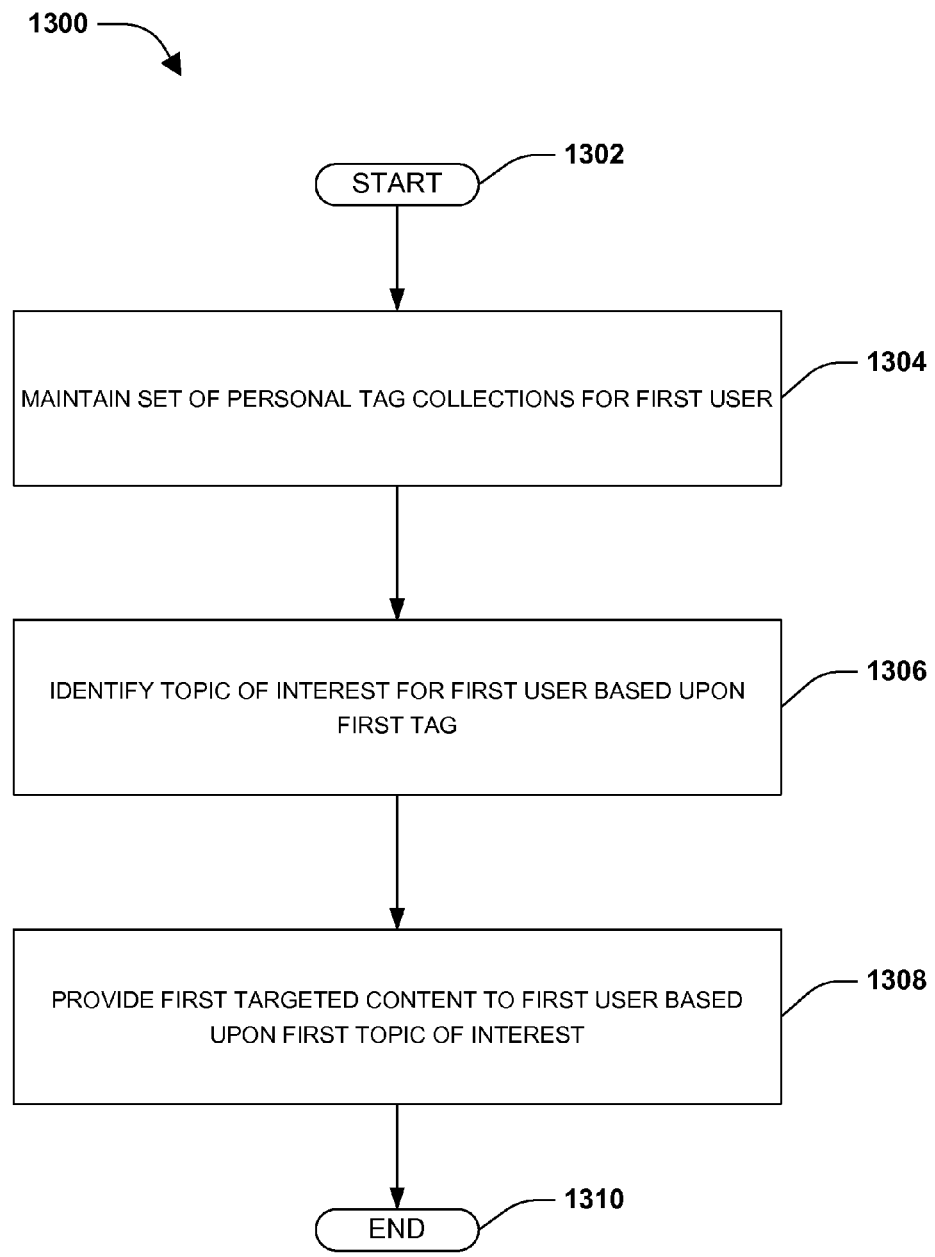
FIG. 13 is a flow diagram illustrating an exemplary method of providing targeted content to users based upon tagged search results.

An embodiment of providing targeted content to users based upon tagged search results is illustrated by an exemplary method 1300 of FIG. 13. At 1302, the method starts. At 1304, a set of personal tag collections may be maintained for a first user. The set of personal tag collections may comprise a first personal tag collection. The first personal tag collection may comprise one or more tagged search results tagged by the first user with a first tag (e.g., websites, images, videos, and/or other search results tagged with a #Cancun tag). In an example, the set of personal tag collections may comprise additional personal tag collections, such as a second personal tag collection comprising one or more tagged search results tagged by the first user with a second tag (e.g., search results tagged with a #Beach tag).

At 1306, a first topic of interest for the first user may be identified based upon the first tag. For example, a first topic of interest "Vacation" may be derived from the #Cancun tag. In an example, the first tag may be selected for identification of the first topic of interest based upon the first personal tag collection comprising a tagged search result count above a relevancy threshold (e.g., the first user may have tagged a plurality of tagged search results with the #Cancun tag, which may indicate that Cancun is relatively important to the first user, as opposed to a #TV tag used by the first user to tag merely a single search result). The first topic of interest may be identified based upon various techniques such as a classification technique, a mapping of topics to tags, a text classifier, etc. At 1308, first targeted content may be provided to the first user based upon the first topic of interest. For example, a vacation image, a vacation website, a cruise promotion, a timeshare video, and/or a plethora of other promotional content associated with the first topic of interest "Vacation" may be identified (e.g., from an advertisement database) and provided to the first user (e.g., through a public tag collection interface, through a personal tag collection interface, through a social network, through a search results page, etc.).

In an example of identifying a topic of interest, a second topic of interest may be identified based upon content comprised within one or more tagged search results of the first (e.g., and/or second, third, etc.) personal tag collection (e.g., a classification of a website, an image classification of an image, textual classification of a social network post, etc.). For example, an entity (e.g., a vacation resort entity) comprised within one or more tagged search results within the first personal tag collection may be identified. The number of tagged search results comprising the entity may be compared with an occurrence threshold, such that the second topic of interest is identified based upon the entity where the number exceeds the occurrence threshold (e.g., a second topic of interest "Vacation Resort" may be identified because the vacation resort entity may occur within at least a threshold number of tagged search results, thus indicating that the first user may have an interest in the vacation resort entity). In this way, second targeted content (e.g., a vacation booking interface for the vacation resort) may be provided to the first user based upon the second topic of interest "Vacation Resort".

In another example of identifying a topic of interest, a third topic of interest may be identified based upon aggregating two or more tags associated with the set of personal tag collections. For example, a category may be determined for the #Cancun tag such as a Tropical Vacation category based upon evaluating the #Cancun tag and/or one or more tagged search results tagged with the #Cancun tag. The #Beach tag may be identified as a second tag based upon the #Beach tag corresponding to the Tropical Vacation category. Because the first tag and the second tag correspond to the same category (e.g., the #Cancun tag and the #Beach tag may be related because the Tropical Vacation category is shared by the #Cancun tag and the #Beach tag), such tags may be aggregated together to identify the third topic of interest such as a third topic of interest "Topical Vacations". In this way, third targeted content (e.g., an advertisement for a tropical getaway) may be provided to the first user based upon the third topic of interest.

In an example of identifying a topic of interest, a fourth topic of interest may be identified based upon aggregating one or more tagged search results of the first personal tag collection (e.g., content of tagged search results tagged with the #Cancun tag) with one or more tagged search results of the second personal tag collection (e.g., content of tagged search results tagged with the #Beach tag). For example, the set of personal tag collections, and tagged search results therein, may be represented as one or more bi-partite graphs. The one or more bi-partite graphs may be traversed to determine that the first personal tag collection, the second personal tag collection and/or other personal tag collections correspond to the category, and the fourth topic of interest may be derived from the category. In this way, fourth targeted content may be provided to the first user based upon the fourth topic of interest.

In an example, a user profile for the first user may be maintained. The user profile may comprise a set of topics of interest associated with the first user. In this way, targeted content may be selectively provided to the first user based upon the user profile. At 1310, the method ends.

Figure 14:
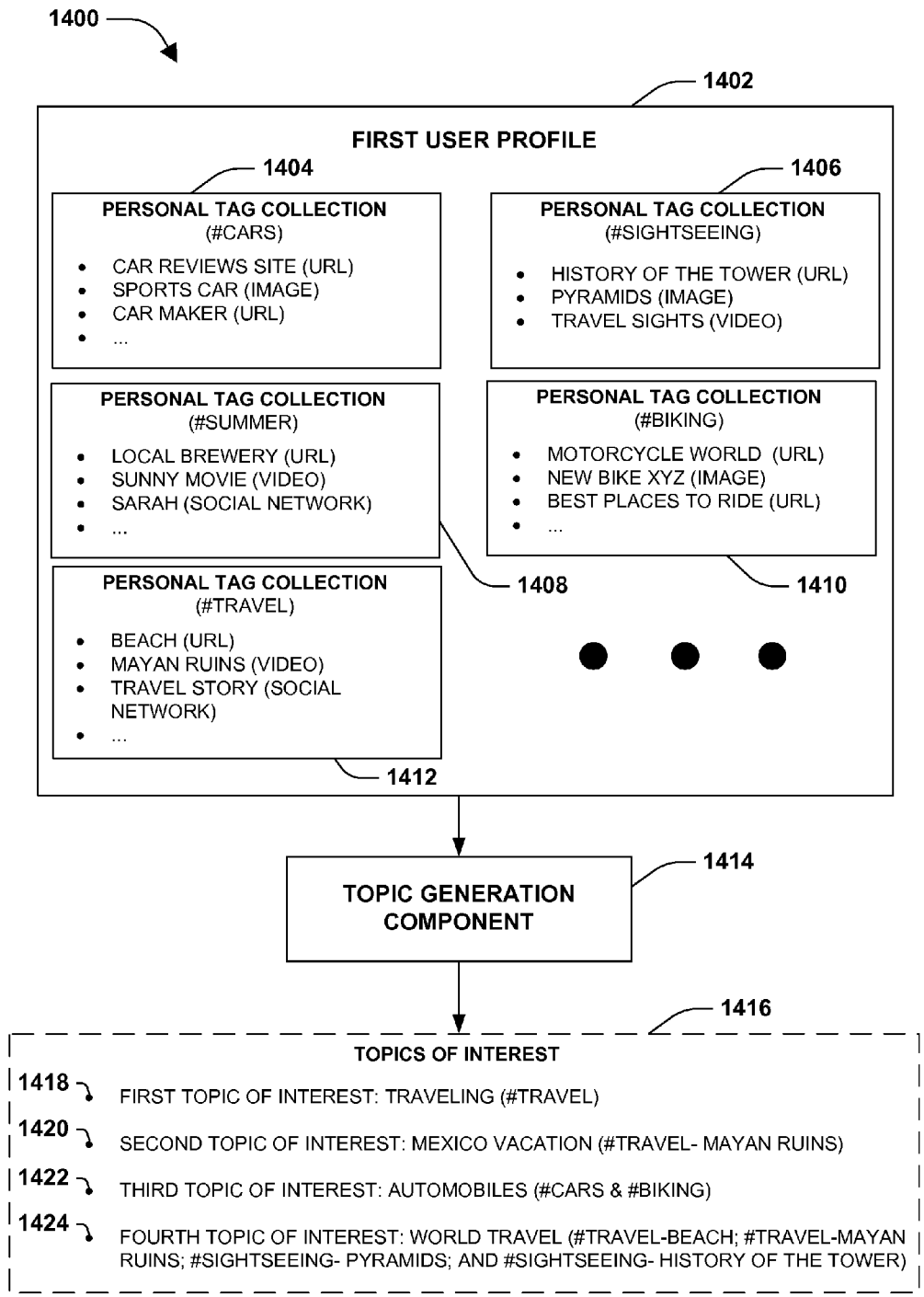
FIG. 14 is a component block diagram illustrating an exemplary system for identifying a set of topics of interest associated with a first user.

FIG. 14 illustrates an example of a system 1400 for identifying a set of topics of interest 1416 associated with a first user. The system 1400 may comprise a topic generation component 1414. The topic generation component 1414 may be configured to evaluate tags, tagged search results, and/or personal tag collections within a first user profile 1402 of the first user. For example, the first user profile 1402 may comprise a Cars personal tag collection 1404, a SightSeeing personal tag collection 1406, a Summer personal tag collection 1408, a Biking personal tag collection 1410, a Travel personal tag collection 1412, and/or other personal tag collections comprising tagged search results tagged by the first user.

The topic generation component 1414 may identify a first topic of interest 1418 "Traveling" based upon a #Travel tag associated with the Travel personal tag collection 1412. The topic generation component 1414 may identify a second topic of interest 1420 "Mexico Vacation" based upon content comprised within one or more tagged search results of the Travel personal tag collection 1412 (e.g., and/or other personal tag collection(s)) such as a tagged Mayan ruins video search result. The topic generation component 1414 may be configured to identify a third topic of interest 1422 "Automobiles" based upon aggregating a #Cars tag of the Cars personal tag collection 1404 and a #Biking tag of the biking personal tag collection 1410. The topic generation component 1414 may be configured to identify a fourth topic of interest 1424 "World Travel" based upon aggregating one or more search results of the Travel personal tag collection 1412, such as a tagged beach search result and the tagged Mayan ruins video search result, with one or more search results of the SightSeeing personal tag collection 1406 such as a tagged pyramids image search result and a tagged history of the tower search result. Also, one or more tags of one or more personal tag collections may be aggregated with one or more tagged search results within one or more personal tag collections to identify one or more topics of interest. In this way, the set of topics of interest 1416 may be generated.

Figure 15:
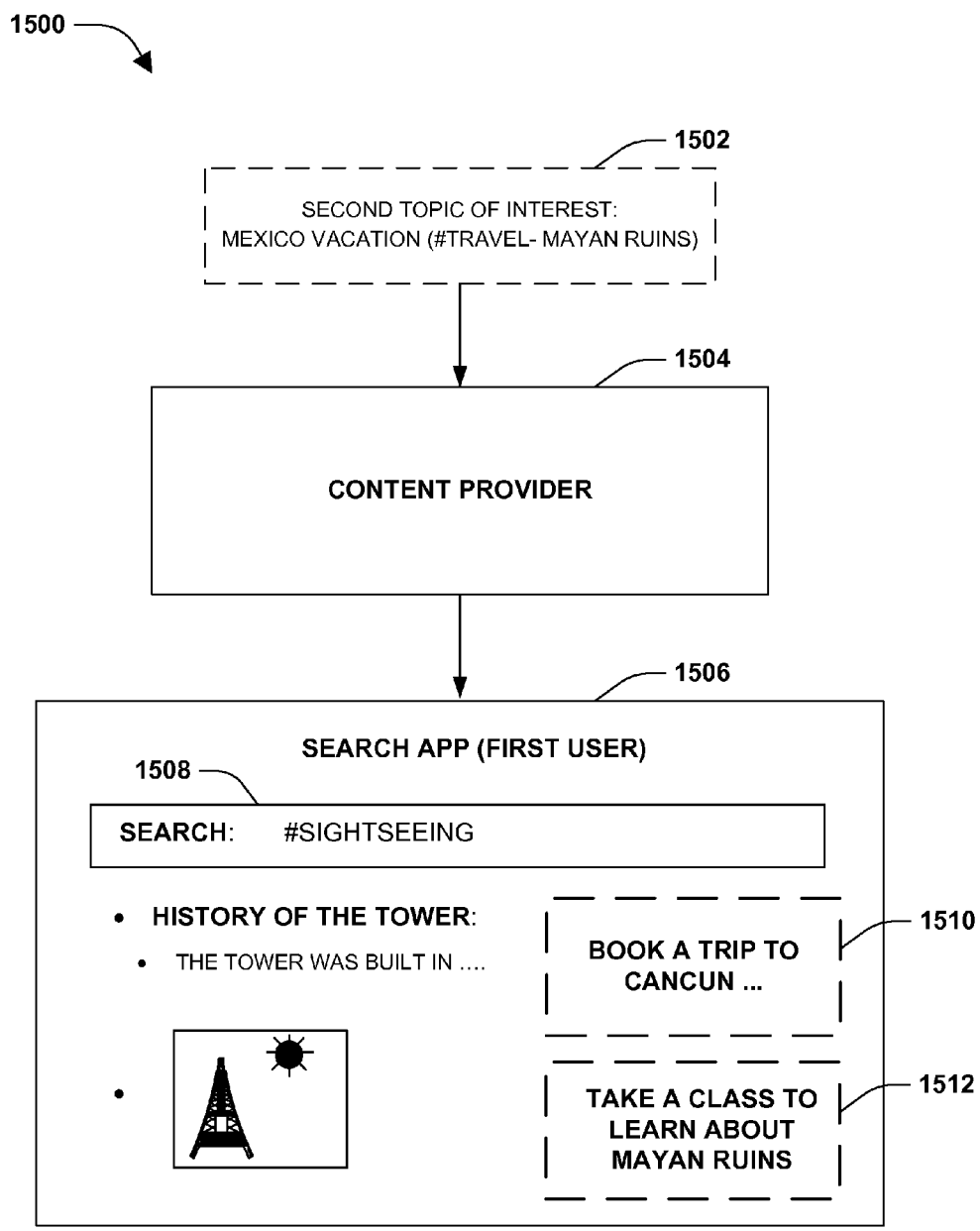
FIG. 15 is a component block diagram illustrating an exemplary system for providing targeted content to users based upon tagged search results.

FIG. 15 illustrates an example of a system 1500 for providing targeted content to users based upon tagged search results. The system 1500 comprises a content provider 1504. The content provider 1504 may be associated with a search app 1506 used by a first user to access tagged search results, such as tagged search results corresponding to a #SightSeeing tag specified by a tag search 1508. The content provider 1504 may be configured to identify a topic of interest associated with the first user. For example, the content provider 1504 may identify a second topic of interest 1502 "Mexico Vacation" based upon a #Travel tag and/or a tagged Mayan ruins video search result tagged with the #Travel tag. In this way, the content provider 1504 may display a first targeted content 1510 providing an interface through which the first user may book a Cancun trip, a second targeted content 1512 providing a link to a class about Mayan ruins, and/or other targeted content.

Figure 16:
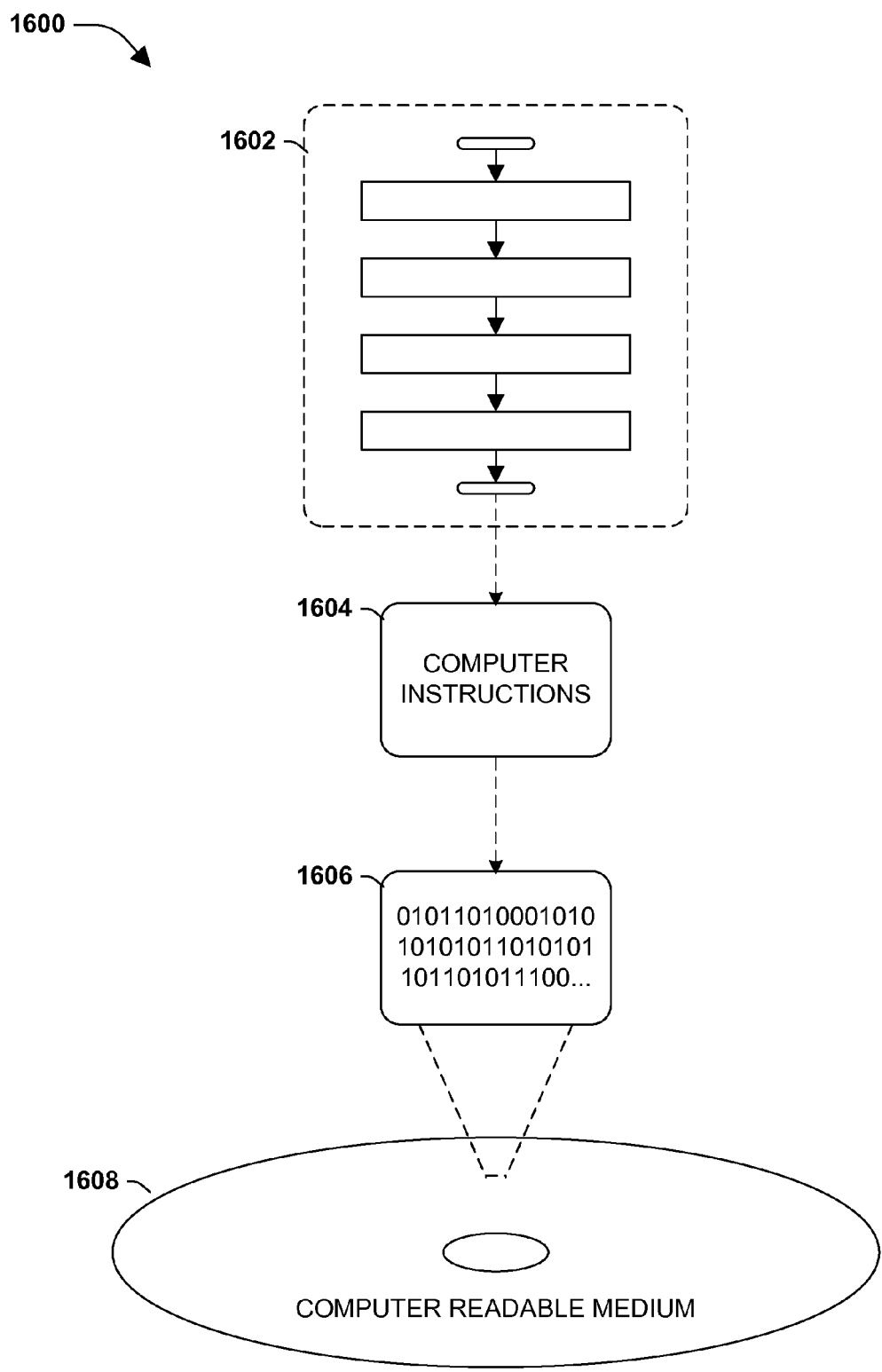
FIG. 16 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 16, wherein the implementation 1600 comprises a computer-readable medium 1608, such as a CD-R, DVD-R, flash drive, a platter of a hard disk drive, etc., on which is encoded computer-readable data 1606. This computer-readable data 1606, such as binary data comprising at least one of a zero or a one, in turn comprises a set of computer instructions 1604 configured to operate according to one or more of the principles set forth herein. In some embodiments, the processor-executable computer instructions 1604 are configured to perform a method 1602, such as at least some of the exemplary method 100 of FIG. 1, at least some of the exemplary method 500 of FIG. 5, at least some of the exemplary method 900 of FIG. 9, and/or at least some of the exemplary method 1300 of FIG. 13, for example. In some embodiments, the processor-executable instructions 1604 are configured to implement a system, such as at least some of the exemplary system 250 of FIG. 2A, at least some of the exemplary system 200 of FIG. 2B, at least some of the exemplary system 300 of FIG.

3, at least some of the exemplary system 400 of FIG. 4, at least some of the exemplary system 600 of FIG. 6, at least some of the exemplary system 700 of FIG. 7, at least some of the exemplary system 1000 of FIG. 10, at least some of the exemplary system 1100 of FIG. 11, at least some of the exemplary system 1200 of FIG. 12, at least some of the exemplary system 1400 of FIG. 14, and/or at least some of the exemplary system 1500 of FIG. 15, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 17:
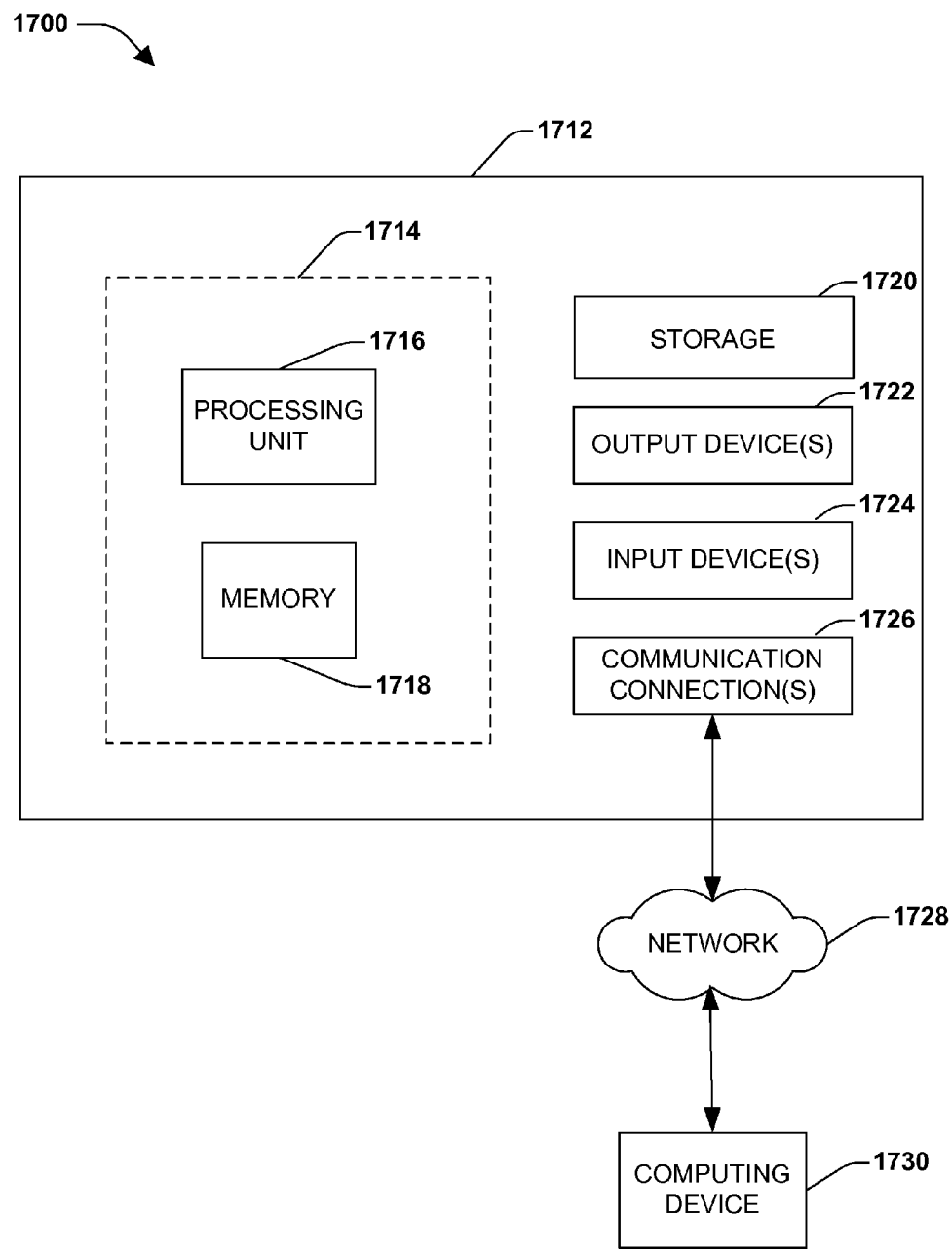
FIG. 17 illustrates an exemplary computing environment wherein one or more of the provisions set forth herein may be implemented.

FIG. 17 and the following discussion provide a brief, general description of a suitable computing environment to implement embodiments of one or more of the provisions set forth herein. The operating environment of FIG. 17 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 17 illustrates an example of a system 1700 comprising a computing device 1712 configured to implement one or more embodiments provided herein. In one configuration, computing device 1712 includes at least one processing unit 1716 and memory 1718. Depending on the exact configuration and type of computing device, memory 1718 may be volatile (such as RAM, for example), non-volatile (such as ROM, flash memory, etc., for example) or some combination of the two. This configuration is illustrated in FIG. 17 by dashed line 1714.

In other embodiments, device 1712 may include additional features and/or functionality. For example, device 1712 may also include additional storage (e.g., removable and/or non-removable) including, but not limited to, magnetic storage, optical storage, and the like. Such additional storage is illustrated in FIG. 17 by storage 1720. In one embodiment, computer readable instructions to implement one or more embodiments provided herein may be in storage 1720. Storage 1720 may also store other computer readable instructions to implement an operating system, an application program, and the like. Computer readable instructions may be loaded in memory 1718 for execution by processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1712. Any such computer storage media may be part of device 1712.

Device 1712 may also include communication connection(s) 1726 that allows device 1712 to communicate with other devices. Communication connection(s) 1726 may include, but is not limited to, a modem, a Network Interface Card (NIC), an integrated network interface, a radio frequency transmitter/receiver, an infrared port, a USB connection, or other interfaces for connecting computing device 1712 to other computing devices. Communication connection(s) 1726 may include a wired connection or a wireless connection. Communication connection(s) 1726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1712 may include input device(s) 1724 such as keyboard, mouse, pen, voice input device, touch input device, infrared cameras, video input devices, and/or any other input device. Output device(s) 1722 such as one or more displays, speakers, printers, and/or any other output device may also be included in device 1712. Input device(s) 1724 and output device(s) 1722 may be connected to device 1712 via a wired connection, wireless connection, or any combination thereof. In one embodiment, an input device or an output device from another computing device may be used as input device(s) 1724 or output device(s) 1722 for computing device 1712.

Components of computing device 1712 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1712 may be interconnected by a network. For example, memory 1718 may be comprised of multiple physical memory units located in different physical locations interconnected by a network.

Those skilled in the art will realize that storage devices utilized to store computer readable instructions may be distributed across a network. For example, a computing device 1730 accessible via a network 1728 may store computer readable instructions to implement one or more embodiments provided herein. Computing device 1712 may access computing device 1730 and download a part or all of the computer readable instructions for execution. Alternatively, computing device 1712 may download pieces of the computer readable instructions, as needed, or some instructions may be executed at computing device 1712 and some at computing device 1730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for facilitating tagging of search results, comprising:
   responsive to receiving a first search query, providing a set of search results on a search results page based upon the first search query, the set of search results comprising a first search result;
   providing, on the search results page,
      a tag suggestion for the first search result, the tag suggestion specifying a first tag, wherein when the first search result is already tagged with the first tag by the user, the tag suggestion is provided in an on state, and wherein when the first search result is not already tagged with the first tag by the user, the tag suggestion is provided in an off state, and
      a create tag interface for the first search result; and
   responsive to receiving a one-click user input on the search result page, by a first user, associated with the tag suggestion, tagging the first search result with the first tag to create a first tagged search result.

2. The method of claim 1, comprising:
   generating the tag suggestion based upon a second user personal tag collection indicating that a second user tagged the first search result with the first tag.

3. The method of claim 1, comprising:
   generating the tag suggestion based upon a public tag collection indicating that a plurality of users tagged the first search result with the first tag.

4. The method of claim 1, comprising:
   providing a second tag suggestion for the first search result, the second tag suggestion specifying a second tag.

5. The method of claim 1, comprising at least one of:
   associating a first comment field with the first tagged search result, the first comment field comprising a first description, by the first user, for the first tagged search result; or
   associating a second comment field with the first tag, the second comment field comprising a second description, by the first user, for the first tag.

6. The method of claim 1, comprising:
   responsive to tagging the first search result with the first tag, transitioning the tag suggestion into an on state.

7. The method of claim 1, the set of search results comprising a second search result, and the method comprising:
   providing a second tag suggestion for the second search result, the second tag suggestion specifying a second tag; and
   responsive to receiving a second one-click user input associated with the second tag suggestion, tagging the second search result with the second tag to create a second tagged search result.

8. The method of claim 1, comprising:
responsive to determining the first search result was tagged with the first tag by a threshold number of other users, increasing a tagging accuracy rating of the first user.

9. The method of claim 8, comprising:
awarding the first user a tagging badge based upon the tagging accuracy rating being above a badge award threshold.

10. The method of claim 1, the tagging the first search result with the first tag comprising:
organizing the first tagged search result into a first personal tag collection comprising one or more tagged search results tagged with the first tag by the first user.

11. The method of claim 1, the tagging the first search result with the first tag comprising:
organizing the first tagged search result into a first public tag collection comprising one or more tagged search results tagged with the first tag by one or more users.

12. The method of claim 1, the tagging the first search result with the first tag comprising:
generating a user tagging model for the first user based upon one or more tagging actions performed by the first user;
responsive to the user tagging model indicating a personal preference to organize tagged search results into personal tag collections, organizing the first tagged search result into a first personal tag collection associated with the first user and the first tag; and
responsive to the user tagging model indicating a public sharing preference to organize tagged search results into public tag collections, organizing the first tagged search result into a first public tag collection associated with the first tag.

13. The method of claim 10, the first search query received through a modal search interface, and the method comprising:
receiving a first tag search, from the first user, through the modal search interface, the first tag search comprising a tag identifier differentiating the first tag search from a search query, the first tag search specifying the first tag; and
providing the first personal tag collection to the first user based upon the first tag search.

14. The method of claim 1, comprising:
receiving a private share setting from the first user, the private share setting specifying one or more users as having access to the first tagged search result; and
exposing the first tagged search result for user access based upon the private share setting.

15. The method of claim 1, the first user tagging the tagging the first search result from a first device, and the method comprising:
exposing the first tagged search result for user access to a non-authenticated user utilizing a second device to access the first tagged search result.

16. A method for facilitating tagging of search results, comprising:
responsive to receiving a first search query, providing a set of search results based upon the first search query, the set of search results comprising a first search result;
providing a create tag interface for the first search result;
responsive to receiving a first tag through the create tag interface from a first user, tagging the first search result with the first tag to create a first tagged search result; and
providing a tag suggestion for the first search result, the tag suggestion specifying a second tag, wherein when the first search result is already tagged with the second tag by the user, the tag suggestion is provided in an on state, and wherein when the first search result is not already tagged with the second tag by the user, the tag suggestion is provided in an off state.

17. The method of claim 16, the tagging the first search result with the first tag comprising:
organizing the first tagged search result into a first public tag collection associated with the first tag.

18. The method of claim 16, the tagging the first search result with the first tag comprising:
organizing the first tagged search result into a first personal tag collection associated with the first tag.

19. A system for facilitating tagging of search results, comprising:
a tag database, comprising one or more computer-storage media, that stores tag information; and
a tagging component, comprising one or more processors, that:
responsive to receiving a first search query, provides a set of search results on a search results page based upon the first search query, the set of search results comprising a first search result,
provides, on the search results page, a first tag suggestion for the first search result, the first tag suggestion specifying a first tag,
provides, on the search results page, a second tag suggestion for the first search result, the second tag suggestion specifying a second tag, and
responsive to receiving a one-click user input on the search result page, by a first user, associated with the first tag suggestion, tags the first search result with the first tag to create a first tagged search result for inclusion within at least one of a first personal tag collection associated with the first tag or a first public tag collection associated with the first tag;
wherein when the first search result is already tagged with the second tag by the user, the second tag suggestion is provided in an on state, and wherein when the first search result is not already tagged with the second tag by the user, the second tag suggestion is provided in an off state.

20. The system of claim 19, wherein the first tag suggestion is generated based upon a second user personal tag collection indicating that a second user tagged the first search result with the first tag.

* * * * *